United States Patent [19]

Gershony et al.

[11] Patent Number: 5,526,143
[45] Date of Patent: Jun. 11, 1996

[54] APPARATUS AND TECHNIQUE FOR GENERATING A SCREENED REPRODUCTION OF AN IMAGE

[75] Inventors: Moshe Gershony, Kfar Sava; Gil Fisher, Petach Tikva, both of Israel

[73] Assignee: Scitex Corporation Ltd., Herzliya, Israel

[21] Appl. No.: 947,282

[22] Filed: Sep. 16, 1992

[51] Int. Cl.[6] .............................. H04N 1/40; G06K 15/00
[52] U.S. Cl. .......................... 358/455; 358/451; 358/518; 395/132
[58] Field of Search ...................... 358/455, 456, 358/518, 459, 519, 523, 530, 487, 448, 107, 458, 228, 209, 527, 406, 298, 443, 465, 425, 426, 451, 453; 395/162, 100, 132; 348/26, 396, 607, 406; 382/18, 51, 54

[56] References Cited

U.S. PATENT DOCUMENTS

| | | | |
|---|---|---|---|
| 3,583,804 | 6/1971 | Mueller | 355/2 |
| 3,664,248 | 5/1972 | Mueller | 95/12.2 |
| 3,719,127 | 3/1973 | Mueller | 95/12.2 |
| 3,997,911 | 12/1976 | Perriman | 358/75 |
| 4,432,009 | 2/1984 | Reitmeier et al. | 358/22 |
| 4,456,924 | 6/1984 | Rosenfeld | 358/75 |
| 4,491,964 | 1/1985 | Sanner | 382/50 |
| 4,499,489 | 2/1985 | Gall et al. | 358/75 |
| 4,556,918 | 12/1985 | Yamazaki et al. | 358/283 |
| 4,621,286 | 11/1986 | Reitmeier et al. | 358/141 |
| 4,635,131 | 1/1987 | Terada et al. | 358/296 |
| 4,676,611 | 6/1987 | Nelson et al. | 351/205 |
| 4,694,342 | 9/1987 | Klees | 358/167 |
| 4,762,998 | 8/1988 | Lubinsky et al. | 250/327.2 |
| 4,774,574 | 9/1988 | Daly et al. | 358/133 |
| 4,825,298 | 4/1989 | Ikuta | 358/298 |
| 4,970,593 | 11/1990 | Cantrell | 358/166 |
| 4,984,097 | 1/1991 | Shu | 358/429 |
| 4,991,109 | 2/1991 | Crookshanks | 364/518 |
| 4,991,111 | 2/1991 | Crookshanks | 364/518 |
| 5,079,721 | 1/1992 | Gershony | 395/132 |
| 5,200,840 | 4/1993 | Koike et al. | 358/451 |
| 5,212,741 | 5/1993 | Barski et al. | 382/51 |
| 5,249,238 | 9/1993 | Komerath et al. | 382/1 |
| 5,377,041 | 12/1994 | Spaulding et al. | 358/518 |

FOREIGN PATENT DOCUMENTS

| | | |
|---|---|---|
| 0207246 | 1/1987 | European Pat. Off. |
| 0292732 | 11/1988 | European Pat. Off. |
| 0481602 | 4/1992 | European Pat. Off. |
| 2157119 | 10/1985 | United Kingdom |

*Primary Examiner*—Paul Ip
*Attorney, Agent, or Firm*—Ladas & Parry

[57] ABSTRACT

A method and apparatus for generating a screened reproduction of an image in which a representation of an original is provided containing information representing the input density values of the original and a plurality of spatial functions and a function of the input density values of the original are utilized to compose reference screen dots. Printing dots are then composed using the reference screen dots and the input density values of the original.

20 Claims, 25 Drawing Sheets

X1A(x)

Y1A(y)

X2A(x)

Y2A(y)

X1A(x)

Y1A(y)

X2A(x)

Y2A(y)

X1A(x)

Y1A(y)

X2A(x)

Y2A(y)

X1A(x)

Y1A(y)

X2A(x)

Y2A(y)

| GRAVURE | COMBINATION | DOT TYPE |
|---|---|---|
| (curve) | (curve) | X1A |
| (curve) | (curve) | Y1A |
| (curve) | (curve) | X2A |
| (curve) | (curve) | Y2A |
| F1(X,Y) = MIN (X1A,Y1A) | F1(X,Y) = MAX (X1A,Y1A) | NON ARITHMETICAL FUNCTION |
| F2(X,Y) = MIN (X2A, Y2A) | F2(X,Y) = MIN (X2A, Y2A) | NON ARITHMETICAL FUNCTION |
| (curve) | (curve) | CLUT |
| O<Z<MAX  AB | O<Z<MAX  AB | Z |
| (shape) | (shape) | |

FIG. 13A

| SQUARE | ROUND | DOT TYPE |
|---|---|---|
| ▲△ (triangle graph) | ▲⌒ (rounded graph) | X1A |
| ▲△ (triangle graph) | ▲⌒ (rounded graph) | Y1A |
| ▲△ (triangle graph) | ▲⌒ (rounded graph) | X2A |
| ▲△ (triangle graph) | ▲⌒ (rounded graph) | Y2A |
| F1(X,Y) = MAX (X1A,Y1A) | F1(X,Y) = MAX (X1A,Y1A) | NON ARITHMETICAL FUNCTION |
| F2(X,Y) = MIN (X2A, Y2A) | F2(X,Y) = MIN (X2A, Y2A) | NON ARITHMETICAL FUNCTION |
| (curve graph) | (curve graph) | CLUT |
| O < Z < MAX AB | O < Z < MAX AB | Z |
| (nested squares pattern) | (nested circles pattern) | |

FIG. 13B

| STAR | DOT TYPE |
|---|---|
|  | X1A |
|  | Y1A |
|  | X2A |
|  | Y2A |
| F1(X,Y) = MAX (X1A,Y1A) | NON ARITHMETICAL FUNCTION |
| F2(X,Y) = MIN (X2A, Y2A) | NON ARITHMETICAL FUNCTION |
|  | CLUT |
| O < Z < MAX<br>AB | Z |
|  | |

APPARATUS AND TECHNIQUE FOR GENERATING A SCREENED REPRODUCTION OF AN IMAGE

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide an on/off control input for a laser plotter.

U.S. Pat. No. 4,635,131 describes a method of and apparatus for producing halftone dot film of graduated density distribution. In an electronic image reproduction system, a halftone dot film of a density distribution of a specific pattern is produced by obtaining a value 1 expressed by an equation $1=f(x)+g(y)$ representative of the specific pattern corresponding to the density value. By superimposing a density signal corresponding to the value 1 on an image signal developed by scanning an original, a reproduction image of the original, modulated by the density signal of a specific pattern, is obtained.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicating lighting of the exposure beam when one of the coordinates (x,y) is between upper and lower limit values, corresponding to the same, which are previously determined for each combination of the other of the coordinates (x,y) and the density value of the image signal.

U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

U.S. Pat. No. 4,556,918 describes a method and apparatus for generating screened halftone images which includes means for assuming an area of halftone dots with desired periodicity and tone reproducibility, subdividing the area into minute cells and setting address values for each of the minute cells, computing out a threshold value of density for each of the cells as a function of the relevant address values and using the computed value as a threshold value of density for the cell, apparatus for obtaining a density-related video signal of the portion of the original corresponding to each of the cells by scanning the original, and apparatus for producing halftone dot signals by comparing the video signals and the threshold value of density with each other.

Applicant/assignee's earlier U.S. Pat. No. 5,079,721 describes apparatus and a technique for generating a screened reproduction of an image including the steps of providing a representation of an original having input density values representing the grey levels of various locations of the original for a given color separation, defining a desired screen dot arrangement for the image, writing screen dots in a line by line fashion, wherein each screen dot is made up of a plurality of lines whose length and location determines the dot configuration and whose length and location is determined by an analog operation employing the input density values of the original and the desired screen dot arrangement.

SUMMARY OF THE INVENTION

The present invention seeks to provide an improved technique and apparatus for generating a screened reproduction of an image.

There is thus provided in accordance with a preferred embodiment of the present invention a technique for generating a screened reproduction of an image comprising the steps of:

providing a representation of an original containing information representing the input density values of the original;

employing a plurality of spatial functions and a function of the input density values of the original to compose reference screen dots;

composing printing dots using the reference screen dots and the input density values of the original.

Additionally in accordance with a preferred embodiment of the present invention there is provided a technique for generating a screened reproduction of an image comprising the steps of:

providing a representation of an original containing information representing the input density values of the original;

employing more than two spatial functions to compose reference screen dots;

composing printing dots using the reference screen dots and the input density values of the original.

Further in accordance with a preferred embodiment of the present invention there is provided a technique for generating a screened reproduction of an image comprising the steps of:

providing a representation of an original containing information representing the input density values of the original;

employing an at least partially non-arithmetic combination of a plurality of spatial functions to compose reference screen dots;

composing printing dots using the reference screen dots and the input density values of the original.

Preferably the plurality of spatial functions comprises a plurality of one-dimensional functions.

In accordance with a preferred embodiment of the present invention each of the plurality of spatial functions is stored in a vector memory.

Additionally in accordance with a preferred embodiment of the present invention the step of employing includes the step of selection of one of the plurality of spatial functions for each combination of spatial variables.

Further in accordance with a preferred embodiment of the present invention, the step of selection includes the step of selecting a function having a maximum value.

Alternatively in accordance with a preferred embodiment of the present invention, the step of selection includes the step of selecting a function having a minimum value.

Further in accordance with a preferred embodiment of the present invention, the employing step produces a two-dimensional result.

Additionally in accordance with a preferred embodiment of the present invention, the employing step includes a plurality of parallel selection steps.

Further in accordance with a preferred embodiment of the present invention, the plurality of parallel selection steps comprises a pair of selection steps.

Additionally in accordance with a preferred embodiment of the present invention, the employing step includes an arithmetic step operating on the results of the parallel selection steps.

Further in accordance with a preferred embodiment of the present invention, the employing step also includes the step of modifying the reference screen dots in accordance with a stored correction table.

Additionally in accordance with a preferred embodiment of the present invention, the employing step comprises the steps of:

employing a first plurality of spatial functions to produce a first result;

employing a second plurality of spatial functions to produce a second result; and selecting between the first result and the second result.

Further in accordance with a preferred embodiment of the present invention there is provided a technique for generating a screened reproduction of an image comprising the steps of:

providing a representation of an original containing information representing the input density values of the original;

employing a plurality of spatial functions to compose reference screen dots, including the steps of:

employing a first plurality of spatial functions to produce a first result;

employing a second plurality of spatial functions to produce a second result; and selecting between the first result and the second result to compose reference screen dots; and composing printing dots using the reference screen dots and the input density values of the original.

Additionally in accordance with a preferred embodiment of the present invention, the step of selecting between the first result and the second result is carried out on the basis of the input density values of the original.

Further in accordance with a preferred embodiment of the present invention, the employing step also includes the step of employing at least one additional plurality of spatial functions to produce at least one additional result and wherein the step of selecting between the first result and the second result is operative to select between the first, second and at least one additional plurality of results.

Additionally in accordance with a preferred embodiment of the present invention, there is provided apparatus for generating a screened reproduction of an image comprising:

apparatus providing a representation of an original containing information representing the input density values of the original;

a reference screen dot composer, employing a plurality of spatial functions and a function of the input density values of the original to compose reference screen dots;

a printing dot composer, composing printing dots using the reference screen dots and the input density values of the original.

Further in accordance with a preferred embodiment of the present invention, there is provided apparatus for generating a screened reproduction of an image comprising:

apparatus providing a representation of an original containing information representing the input density values of the original;

a reference screen dot composer, employing more than two spatial functions to compose reference screen dots; and a printing dot composer, composing printing dots using the reference screen dots and the input density values of the original.

Additionally in accordance with a preferred embodiment of the present invention, there is provided apparatus for generating a screened reproduction of an image comprising:

apparatus providing a representation of an original containing information representing the input density values of the original;

a reference screen dot composer, employing an at least partially non-arithmetic combination of a plurality of spatial functions to compose reference screen dots;

a printing dot composer, composing printing dots using the reference screen dots and the input density values of the original.

Preferably, the plurality of spatial functions comprises a plurality of one-dimensional functions.

In accordance with a preferred embodiment of the present invention, each of the plurality of spatial functions is stored in a vector memory.

Further in accordance with a preferred embodiment of the present invention, the reference screen dot composer comprises a selector for selecting one of the plurality of spatial functions for each combination of spatial variables.

Additionally in accordance with a preferred embodiment of the present invention, the selector is operative for selecting a function having a maximum value. Alternatively, the selector is operative for selecting a function having a minimum value.

Further in accordance with a preferred embodiment of the invention the reference screen dot composer produces a two-dimensional result.

Additionally in accordance with a preferred embodiment of the invention the reference screen dot composer a plurality of parallel selectors.

Further in accordance with a preferred embodiment of the invention the plurality of parallel selectors comprises a pair of selectors.

Additionally in accordance with a preferred embodiment of the invention the reference screen dot composer is operative to carry out an arithmetic function on the results produced by the parallel selectors.

Preferably the reference screen dot composer also includes apparatus for modifying the reference screen dots in accordance with a stored correction table.

In accordance with a preferred embodiment of the present invention, the reference screen dot composer comprises:

apparatus employing a first plurality of spatial functions to produce a first result;

apparatus employing a second plurality of spatial functions to produce a second result; and a selector for selecting between the first result and the second result.

Additionally in accordance with an embodiment of the present invention there is provided apparatus for generating a screened reproduction of an image comprising:

apparatus providing a representation of an original containing information representing the input density values of the original;

a reference screen dot composer, employing a plurality of spatial functions to compose reference screen dots, including:

apparatus employing a first plurality of spatial functions to produce a first result;

apparatus employing a second plurality of spatial functions to produce a second result; and a selector selecting between the first result and the second result to compose reference screen dots; and a printing dot composer, composing printing dots using the reference screen dots and the input density values of the original.

Preferably the selector for selecting between the first result and the second result is operative using the input density values of the original.

In accordance with a preferred embodiment of the present invention, the reference screen dot composer also includes apparatus for employing at least one additional plurality of spatial functions to produce at least one additional result and wherein selector for selecting between the first result and the second result is operative to select between the first, second and at least one additional plurality of results.

Additionally in accordance with a preferred embodiment of the present invention composition of reference screen dots is carried out by generating a grid-independent, reference screen dot value continuum.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
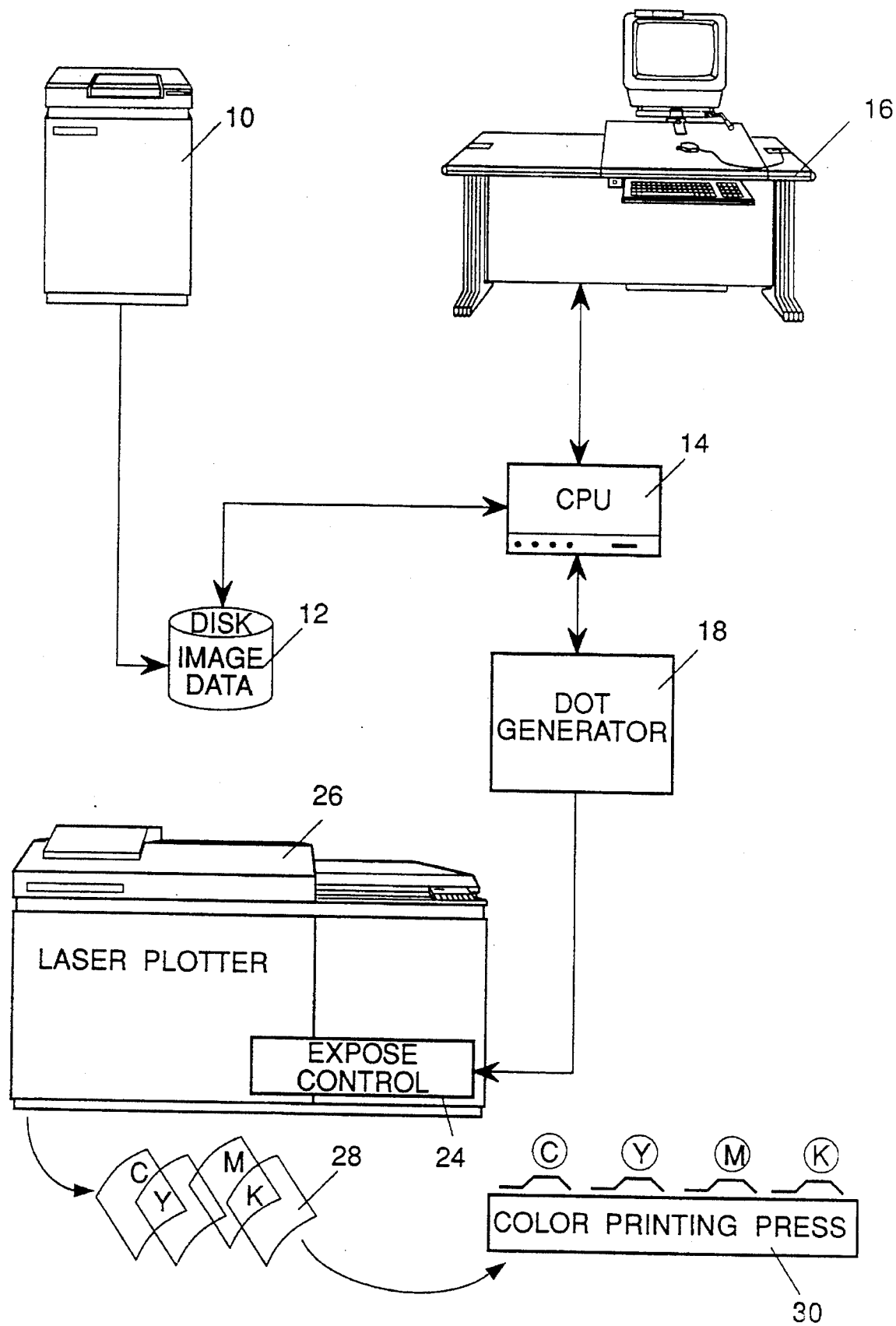
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on a image data disc 12 or any other suitable storage medium, which is accessible by a CPU 14, such as an Intel 80486. Interfacing with the CPU 14 is an interactive workstation 16, such as a Scitex Prisma, manufactured and sold by Scitex Corporation Ltd. of Herzlia, Israel.

CPU 14 interfaces with screen dot generation circuitry 18, which in turn provides a control output to laser beam control circuitry 24 in a laser plotter 26, such as a Raystar, manufactured and sold by Scitex Corporation Ltd. of Herzlia, Israel.

Laser plotter 26 produces halftone film color separations 28 which are employed in a conventional process color printing press 30, to produce process color prints.

Figure 2:
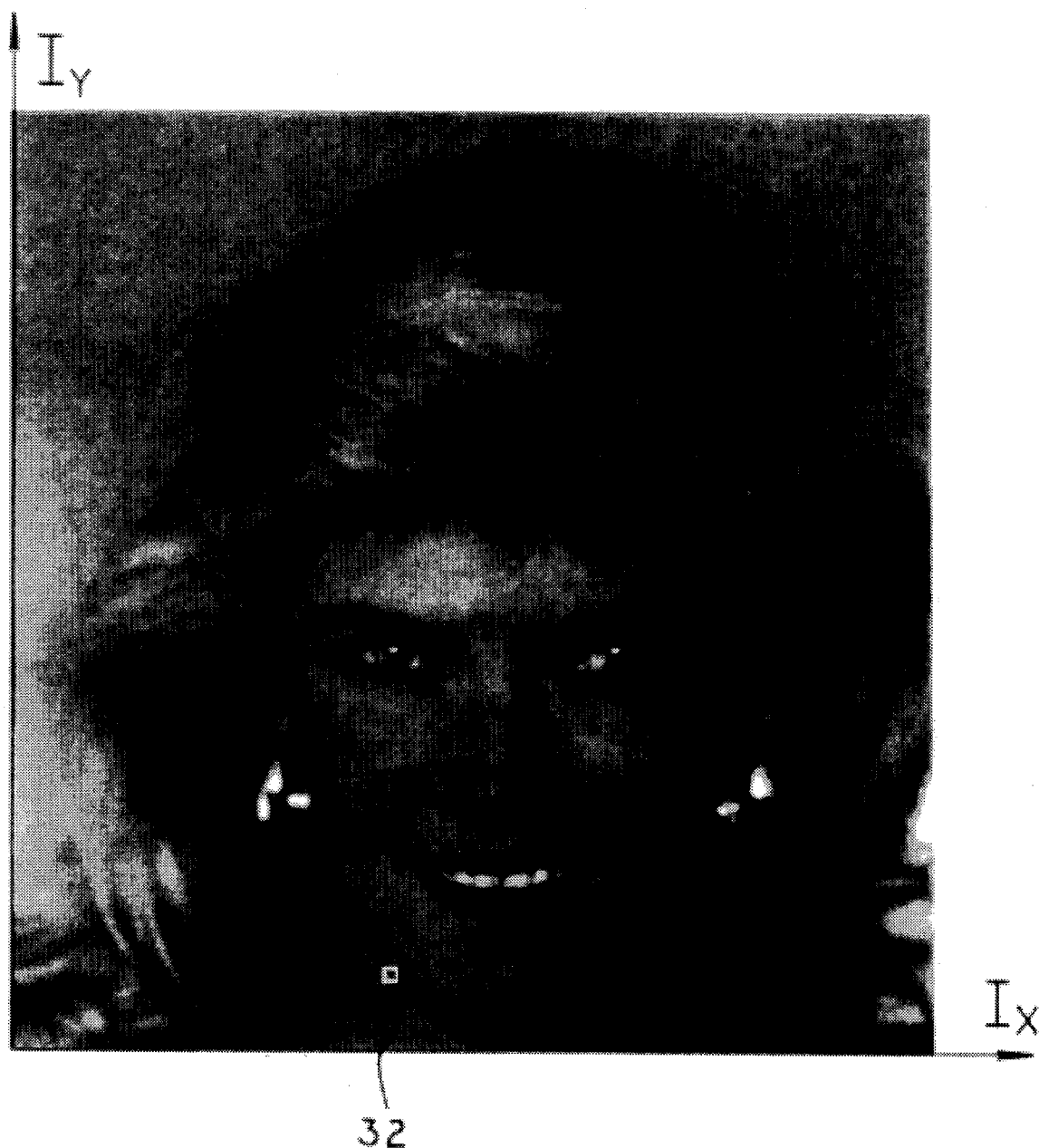
FIG. 2 is an illustration of one color separation of a typical color original.
Figure 3:
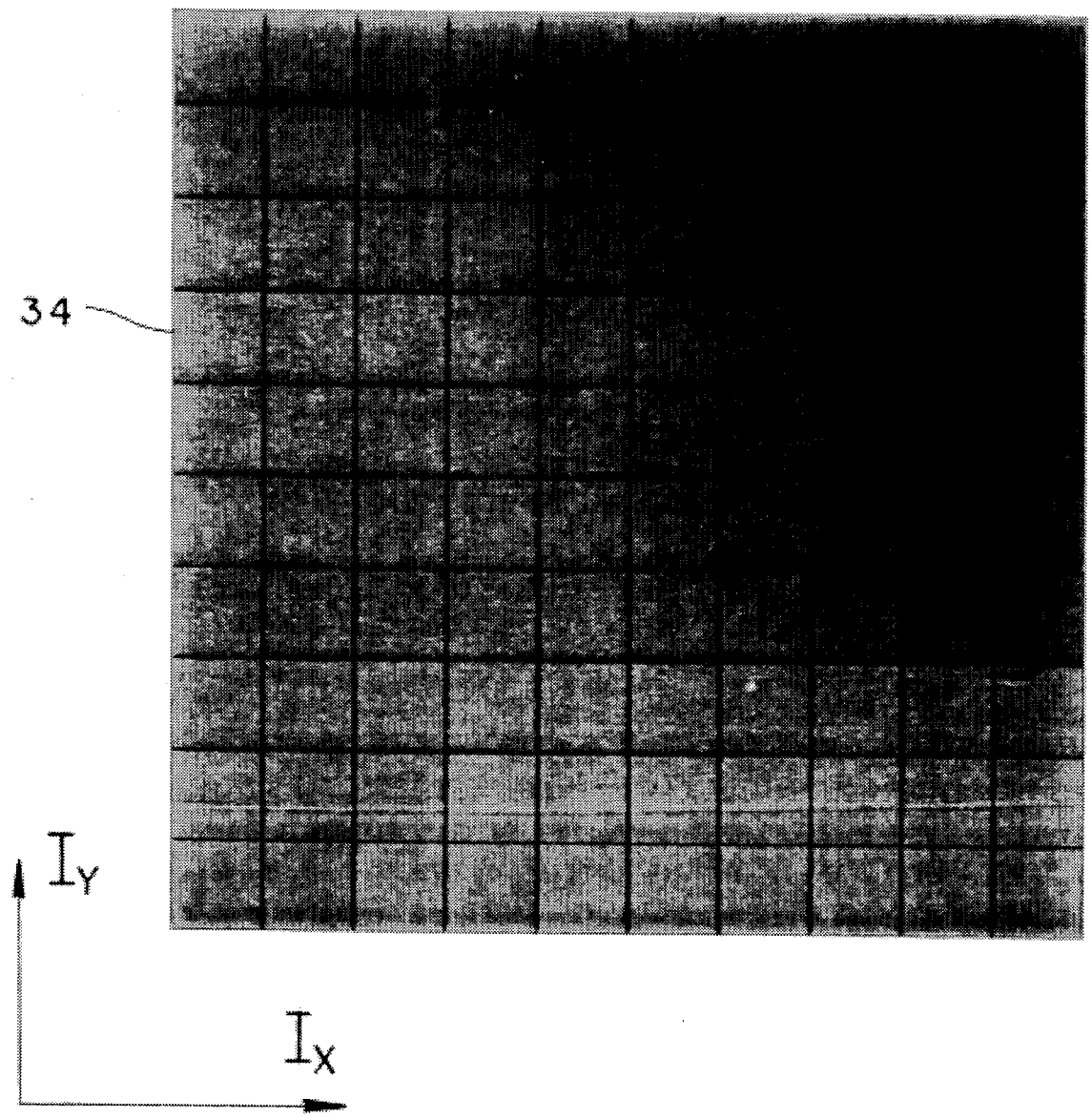
FIG. 3 is an enlarged illustration of a small portion of the halftone color separation of FIG. 2.

Reference is now made to FIGS. 2 and 3. FIG. 2 illustrates a typical halftone color separation which is stored on disc 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinate axes $I_x$ and $I_y$. Pixels 34 typically have a resolution of 100–400 pixels per inch along each of the coordinate axes of the input image.

Figure 4:
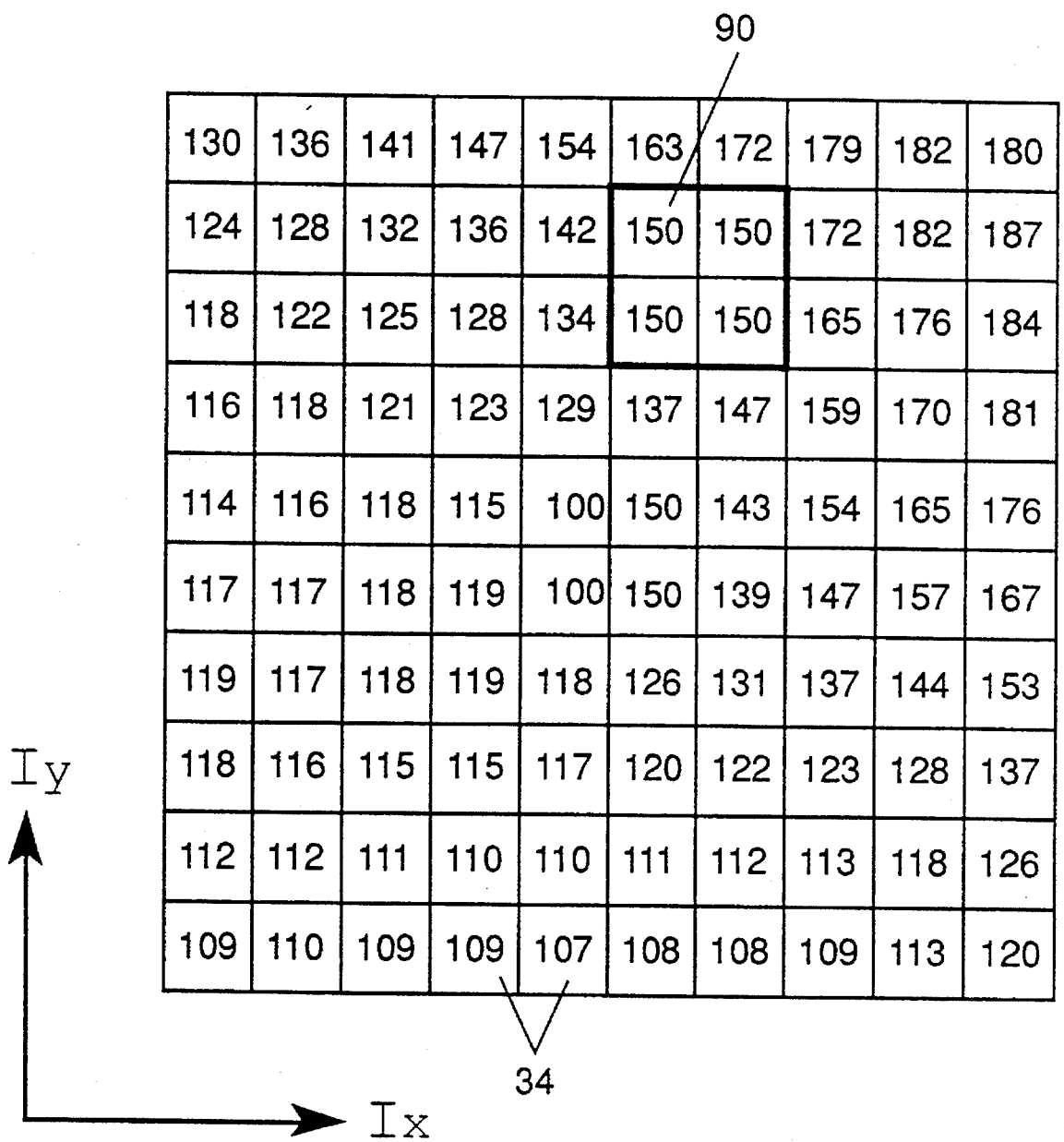
FIG. 4 is an illustration of pixel-by-pixel input density values for the small portion of the color separation of FIG. 2.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

Figure 5A:
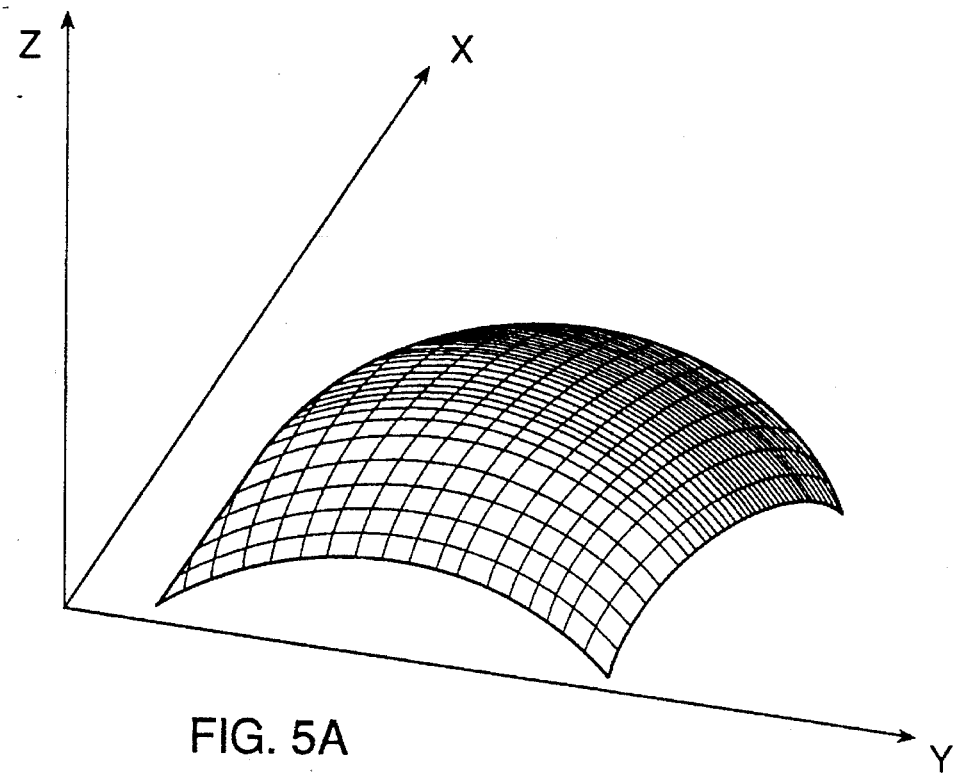
FIG. 5A is a pictorial illustration of a printing dot constructed and operative in accordance with a preferred embodiment of the present invention.
Figure 5B:
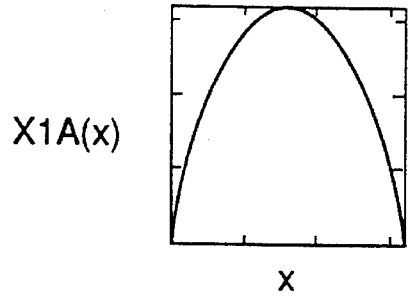
FIGS. 5B, 5C, 5D and 5E are illustrations of spatial functions employed to create the printing dot of FIG. 5A in accordance with a preferred embodiment of the present invention.
Figure 5C:
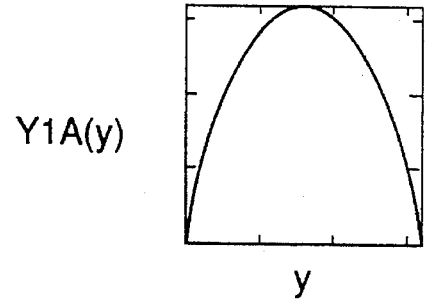
Figure 5D:
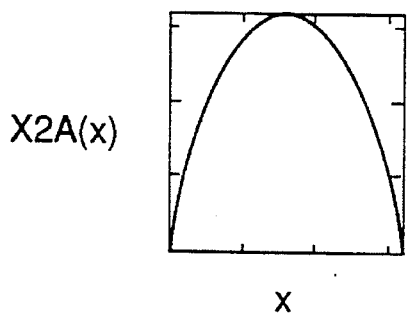
Figure 5E:
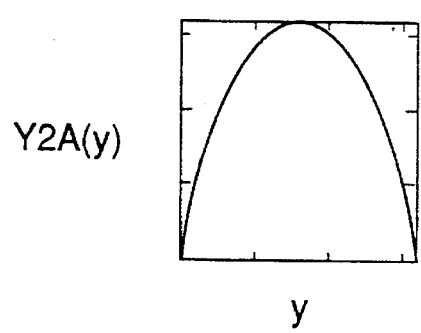

Reference is now made to FIGS. 5A–5E, which illustrate a round printing dot constructed and operative in accordance with a preferred embodiment of the present invention together with spatial functions employed to create the round printing dot. FIG. 5A shows the round printing dot in a Cartesian frame of reference wherein the x and y axes represent spatial dimensions and the z axis represents the screen value. It is appreciated that truncation of the dot of FIG. 5A at a given z value produces a round dot whose dimensions are determined by the z value in accordance with the spatial functions which are employed to create the dot.

The various one-dimensional spatial functions which are employed to create the dot of FIG. 5A appear in FIGS. 5B–5E. In accordance with a preferred embodiment of the present invention, these spatial functions are combined in the following manner to achieve the dot of FIG. 5A:

$$Z=MAX(X1A,Y1A)+MIN(X2A,Y2A)$$

It is noted that here the configurations of all of the spatial functions are identical upside-down parabolas. This need not necessarily be the case for non-round printing dots. An asymmetrical or symmetrical elliptical dot may be realized by employing similar but non-identical spatial functions.

Figure 5F:
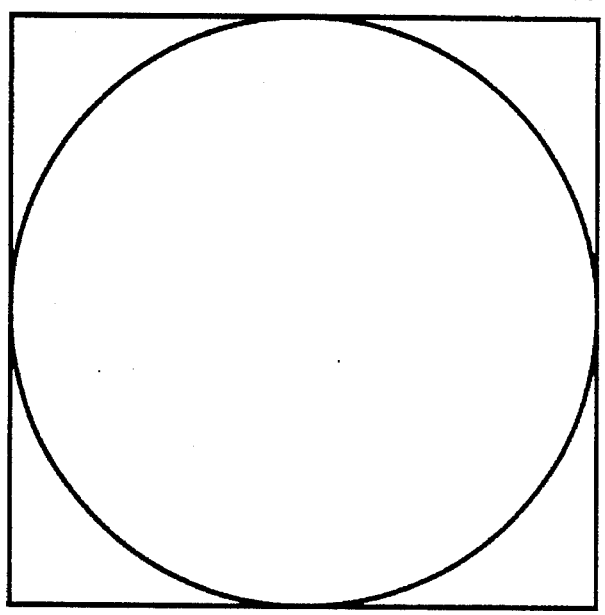
FIGS. 5F and 5G are illustrations of the printing dot of FIG. 5A as it appears for input density values of 75% and 50% respectively.
Figure 5G:
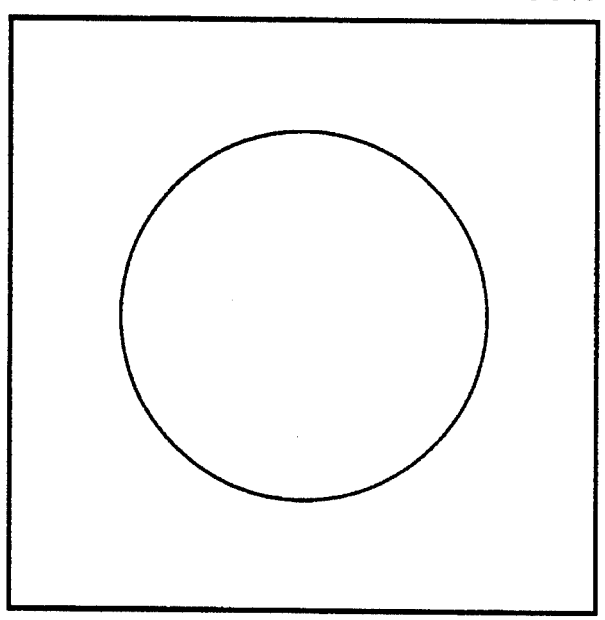

Reference is now made to FIGS. 5F and 5G, which illustrate truncations of the dot of FIG. 5A, representing the printing dot at input densities of 75% and 50% respectively.

Figure 6A:
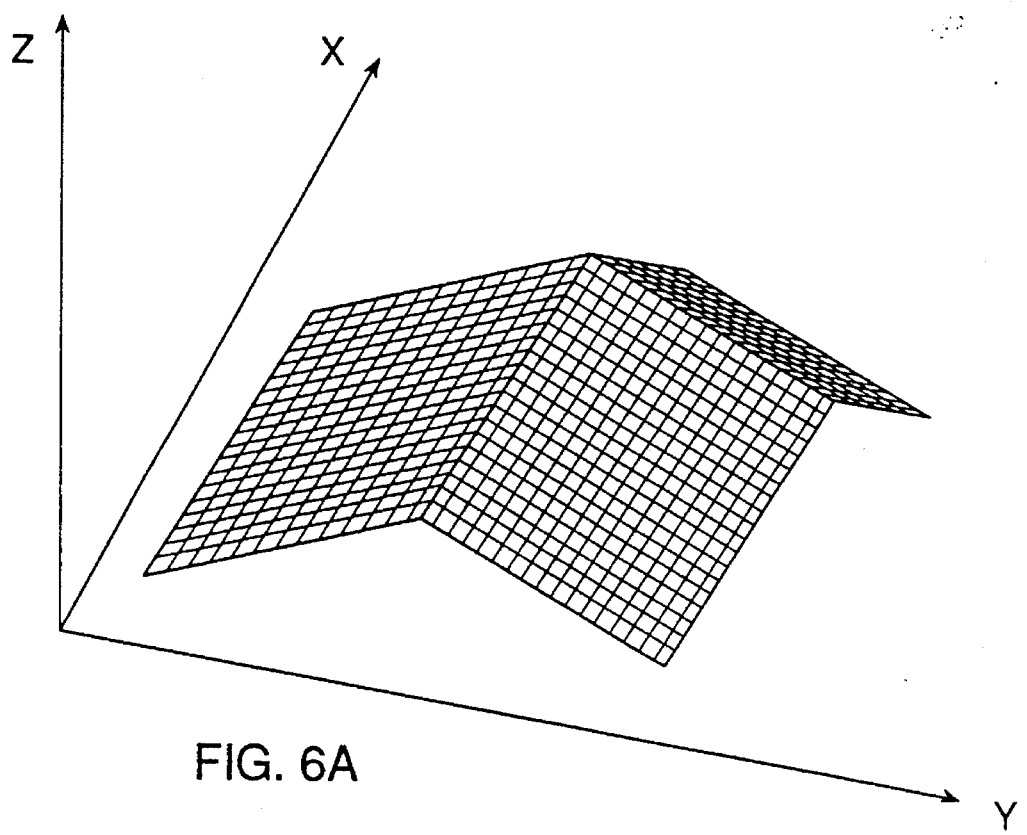
FIG. 6A is a pictorial illustration of a printing dot constructed and operative in accordance with a preferred embodiment of the present invention.
Figure 6B:
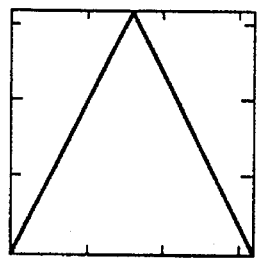
FIGS. 6B, 6C, 6D and 6E are illustrations of spatial functions employed to create the printing dot of FIG. 6A in accordance with a preferred embodiment of the present invention.
Figure 6C:
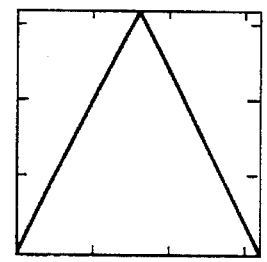
Figure 6D:
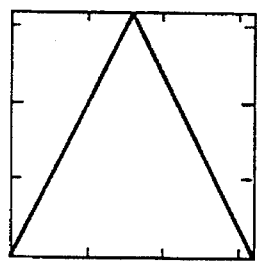
Figure 6E:
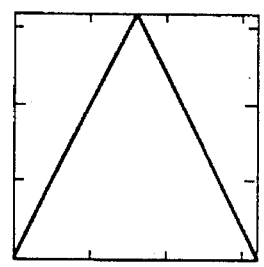

Reference is now made to FIGS. 6A–6E, which illustrate a square printing dot constructed and operative in accordance with a preferred embodiment of the present invention together with spatial functions employed to create the square printing dot. FIG. 6A shows the square printing dot in a Cartesian frame of reference wherein the x and y axes represent spatial dimensions and the z axis represents the screen value. It is appreciated that truncation of the dot of FIG. 6A at a given z value produces a square dot whose dimensions are determined by the z value in accordance with the spatial functions which are employed to create the dot.

The various one-dimensional spatial functions which are employed to create the dot of FIG. 6A appear in FIGS. 6B–6E. In accordance with a preferred embodiment of the present invention, these spatial functions are combined in the following manner to achieve the dot of FIG. 6A:

$$Z=MAX(X1A,Y1A)+MIN(X2A,Y2A)$$

It is noted that here the configurations of all of the spatial functions are identical triangular functions. This need not necessarily be the case for non-square printing dots. It is noted that an asymmetrical or symmetrical diamond-shaped dot may be realized by employing similar but non-identical spatial functions.

Figure 6F:
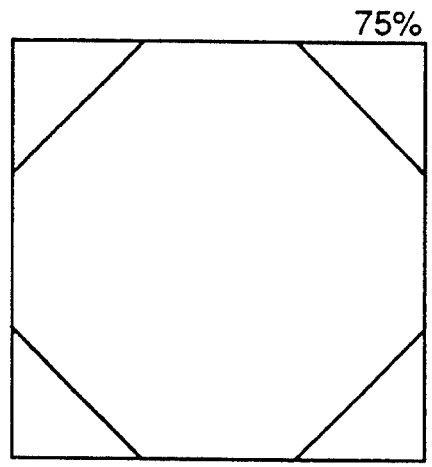
FIGS. 6F, 6G and 6H are illustrations of the printing dot of FIG. 6A as it appears for input density values of 75%, 50% and 25% respectively.
Figure 6G:
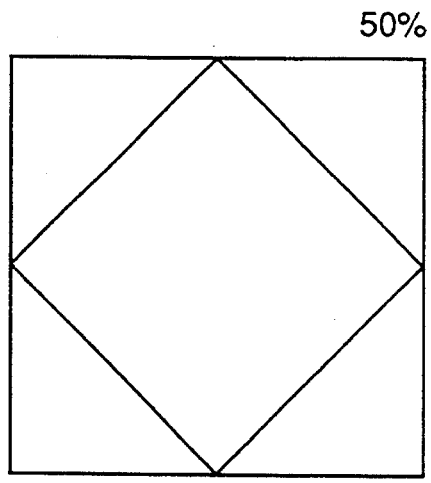
Figure 6H:
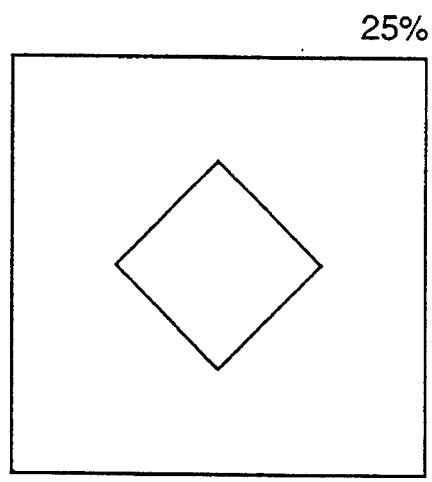

Reference is now made to FIGS. 6F–6H, which illustrate truncations of the dot of FIG. 6A, representing the printing dot at input densities of 75%, 50% and 25% respectively.

Reference is now made to FIGS. 7A–7E, which illustrate a combination printing dot constructed and operative in accordance with a preferred embodiment of the present invention together with spatial functions employed to create the combination printing dot. The combination printing dot has characteristics either of a round dot or a square dot depending on the input density. The round dot may be expressed positively or negatively.

Figure 7A:
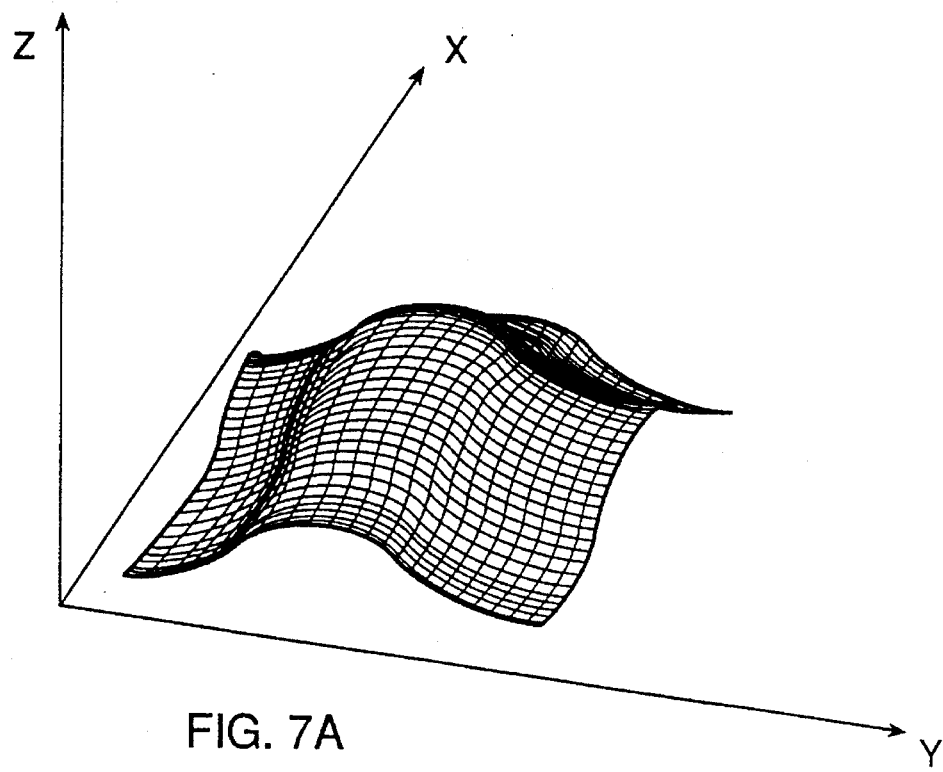
FIG. 7A is a pictorial illustration of a printing dot constructed and operative in accordance with a preferred embodiment of the present invention.
Figure 7B:
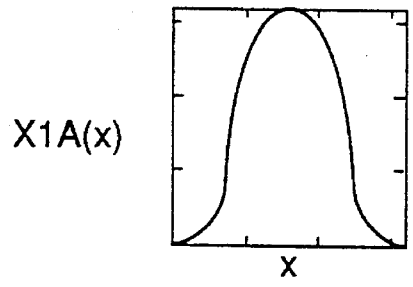
FIGS. 7B, 7C, 7D and 7E are illustrations of spatial functions employed to create the printing dot of FIG. 7A in accordance with a preferred embodiment of the present invention.
Figure 7C:
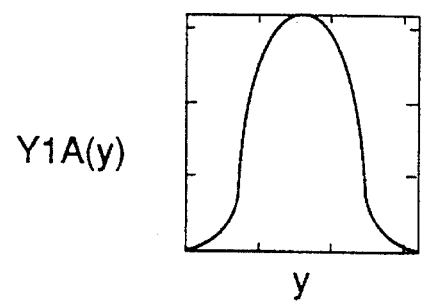
Figure 7D:
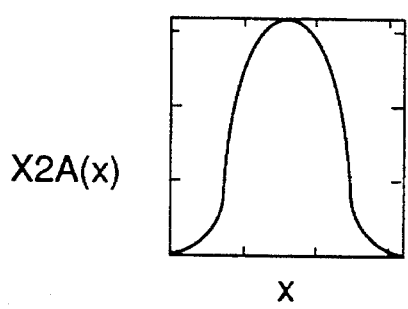
Figure 7E:
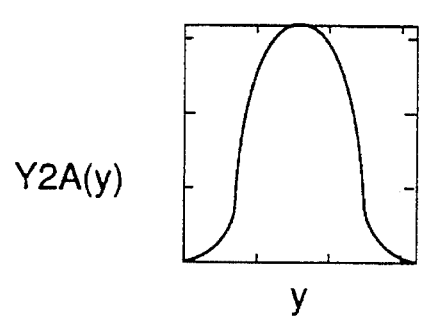

FIG. 7A shows the combination printing dot in a Cartesian frame of reference wherein the x and y axes represent spatial dimensions and the z axis represents the screen value. It is appreciated that truncation of the dot of FIG. 7A at a given z value produces a combination dot whose dimensions are determined by the z value in accordance with the spatial functions which are employed to create the dot.

The various one-dimensional spatial functions which are employed to create the dot of FIG. 7A appear in FIGS. 7B–7E. In accordance with a preferred embodiment of the present invention, these spatial functions are combined in the following manner to achieve the dot of FIG. 7A:

$$Z=MAX(X1A,Y1A)+MIN(X2A,Y2A)$$

It is noted that here the configurations of all of the spatial functions are identical functions. This need not necessarily be the case. An asymmetrical or symmetrical dot may be realized by employing similar but non-identical spatial functions.

Figure 7F:
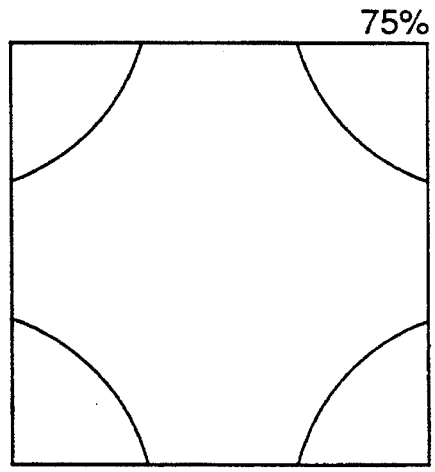
FIGS. 7F, 7G and 7H are illustrations of the printing dot of FIG. 7A as it appears for input density values of 75%, 50% and 25% respectively.
Figure 7G:
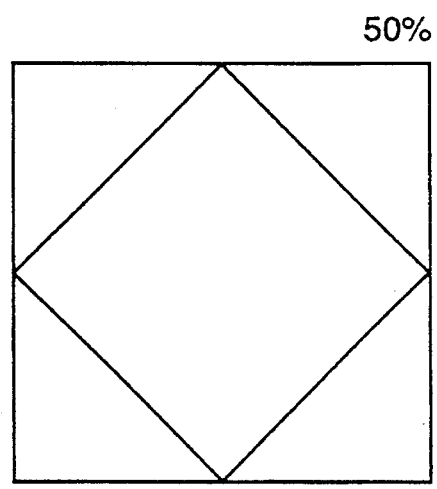
Figure 7H:
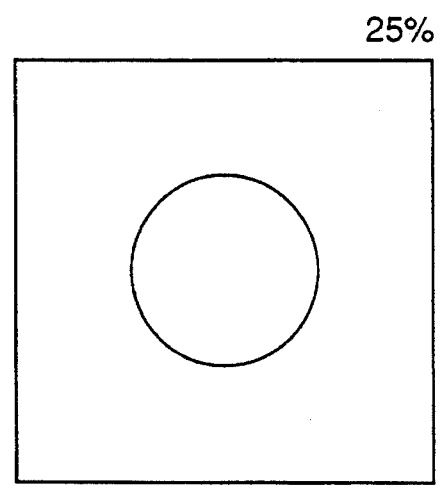

Reference is now made to FIGS. 7F–7H, which illustrate truncations of the dot of FIG. 7A, representing the printing dot at input densities of 75%, 50% and 25% respectively.

Reference is now made to FIGS. 8A–8E, which illustrate a gravure printing dot constructed and operative in accordance with a preferred embodiment of the present invention together with spatial functions employed to create the gravure printing dot. The gravure printing dot has characteristics of a square pyramid-shaped dot.

Figure 8A:
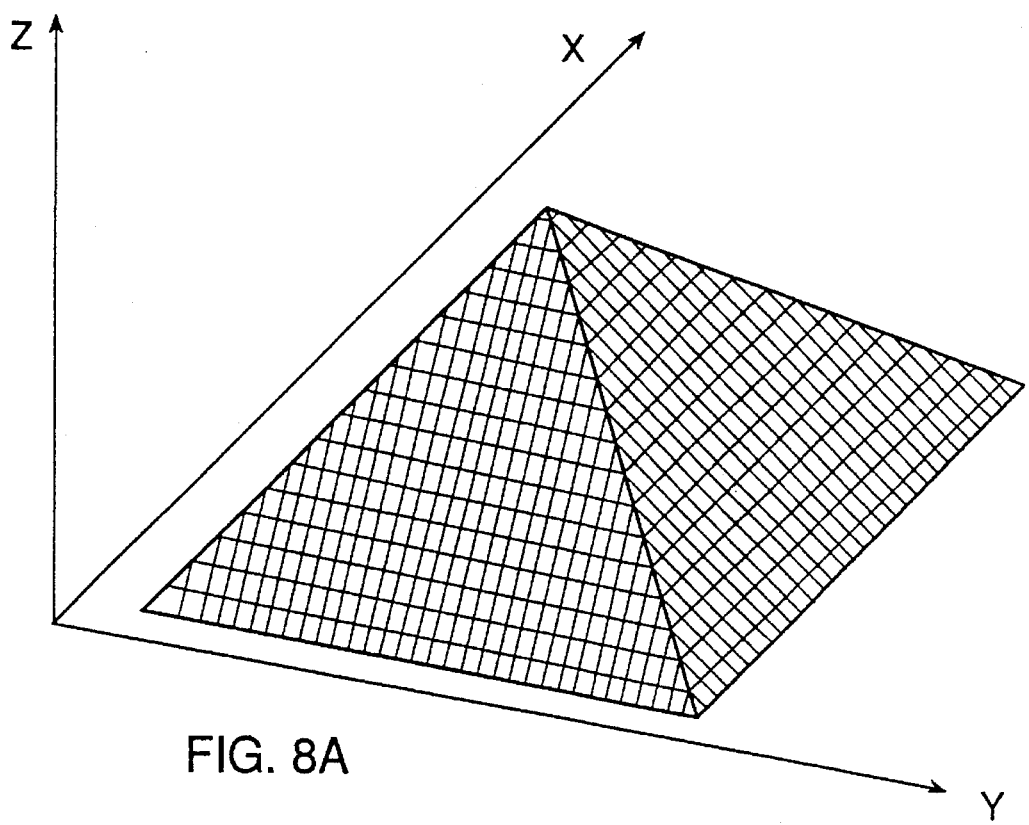
FIG. 8A is a pictorial illustration of a printing dot constructed and operative in accordance with a preferred embodiment of the present invention.
Figure 8B:
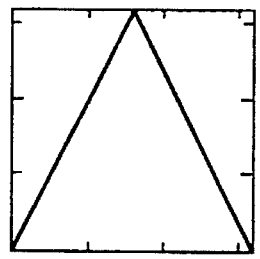
FIGS. 8B, 8C, 8D and 8E are illustrations of spatial functions employed to create the printing dot of FIG. 8A in accordance with a preferred embodiment of the present invention.
Figure 8C:
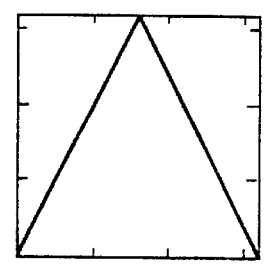
Figure 8D:
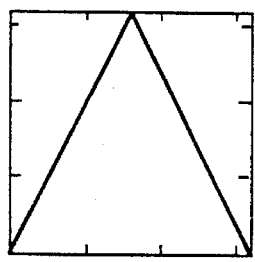
Figure 8E:
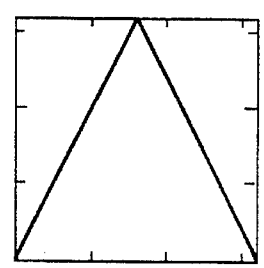

FIG. 8A shows the gravure printing dot in a Cartesian frame of reference wherein the x and y axes represent spatial dimensions and the z axis represents the screen value. It is appreciated that truncation of the dot of FIG. 8A at a given z value produces a gravure dot whose dimensions are determined by the z value in accordance with the spatial functions which are employed to create the dot.

The various one-dimensional spatial functions which are employed to create the dot of FIG. 8A appear in FIGS. 8B–8E. In accordance with a preferred embodiment of the present invention, these spatial functions are combined in the following manner to achieve the dot of FIG. 8A:

$$Z=MIN(X1A,Y1A)+MIN(X2A,Y2A)$$

It is noted that here the configurations of all of the spatial functions are identical functions. This need not necessarily be the case. An asymmetrical dot may be realized by employing similar but non-identical spatial functions.

Figure 8F:
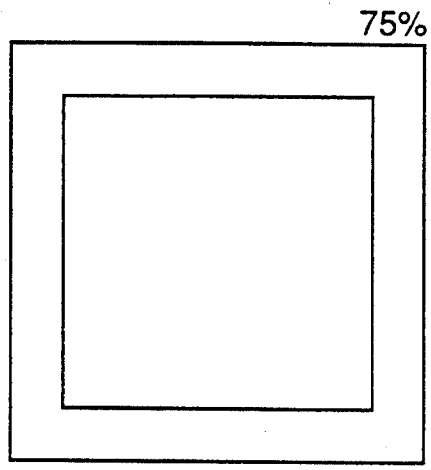
FIGS. 8F, 8G and 8H are illustrations of the printing dot of FIG. 8A as it appears for input density values of 75%, 50% and 25% respectively.
Figure 8G:
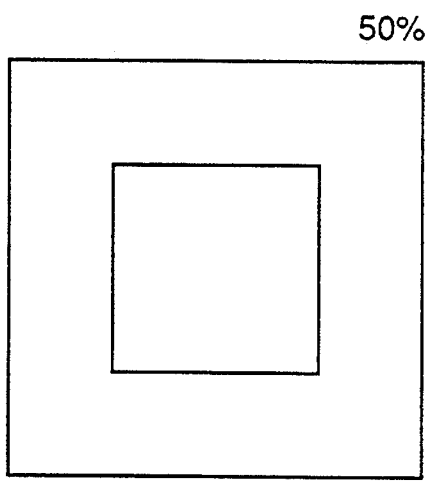
Figure 8H:
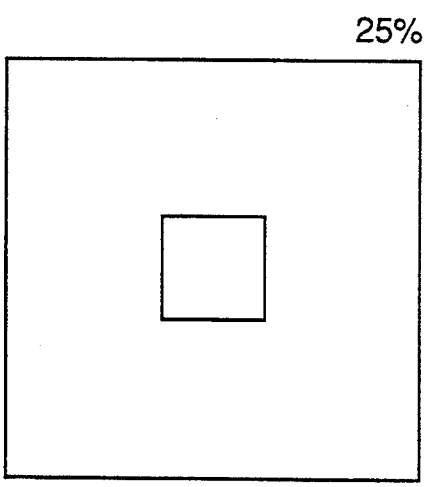

Reference is now made to FIGS. 8F–8H, which illustrate truncations of the dot of FIG. 8A, representing the printing dot at input densities of 75%, 50% and 25% respectively.

Reference is now made to FIGS. 9A–9E, which illustrate a modified gravure printing dot constructed and operative in accordance with a preferred embodiment of the present invention together with spatial functions employed to create the modified gravure printing dot. The modified gravure printing dot has characteristics of a partially rounded square pyramid-shaped dot.

Figure 9A:
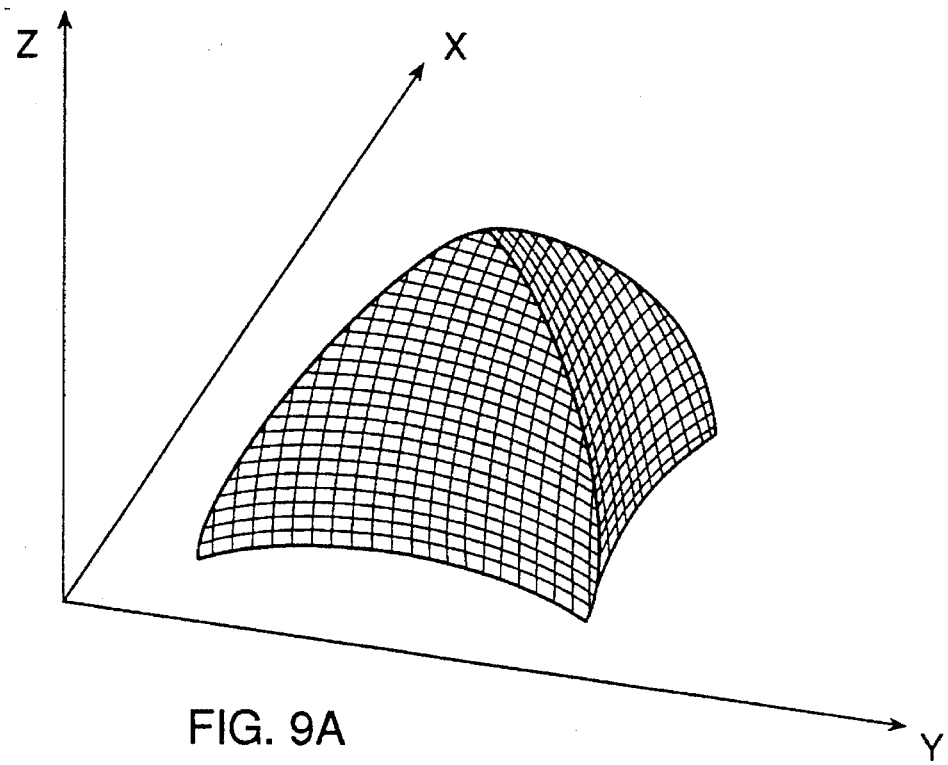
FIG. 9A is a pictorial illustration of a printing dot constructed and operative in accordance with a preferred embodiment of the present invention.
Figure 9B:
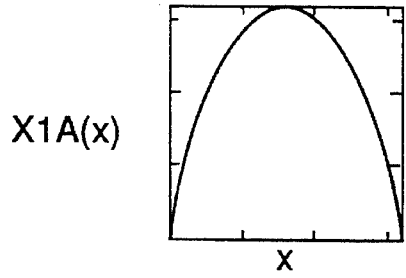
FIGS. 9B, 9C, 9D and 9E are illustrations of spatial functions employed to create the printing dot of FIG. 9A in accordance with preferred embodiment of the present invention.
Figure 9C:
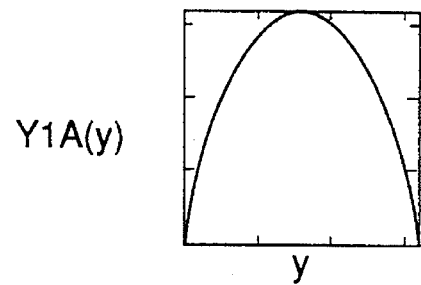
Figure 9D:
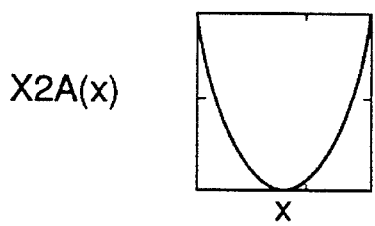
Figure 9E:
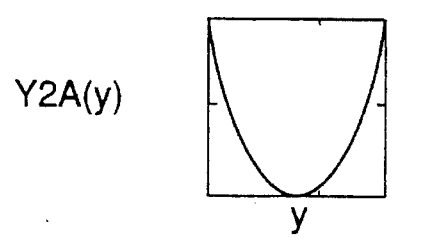

FIG. 9A shows the modified gravure printing dot in a Cartesian frame of reference wherein the x and y axes represent spatial dimensions and the z axis represents the screen value. It is appreciated that truncation of the dot of FIG. 9A at a given z value produces a modified gravure dot whose dimensions are determined by the z value in accordance with the spatial functions which are employed to create the dot.

The various one-dimensional spatial functions which are employed to create the dot of FIG. 9A appear in FIGS. 9B–9E. In accordance with a preferred embodiment of the present invention, these spatial functions are combined in the following manner to achieve the dot of FIG. 9A:

$$Z=MIN(X1A,Y1A)+MIN(X2A,Y2A)$$

It is noted that here the configurations of two of the spatial functions, X1A and Y1A are identical upside down parabola functions. The other two spatial functions X2A and Y2A are identical parabolas. This need not necessarily be the case. An asymmetrical dot may be realized by employing similar but non-identical spatial functions.

Figure 9F:
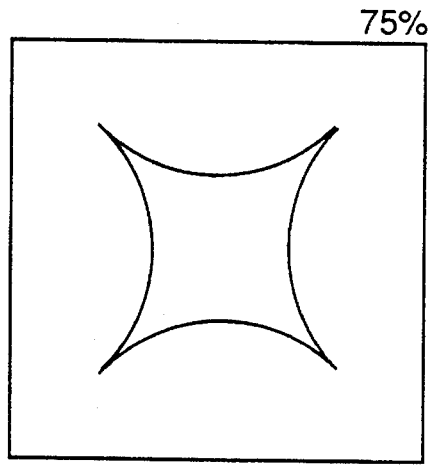
FIGS. 9F, 9G and 9H are illustrations of the printing dot of FIG. 9A as it appears for input density values of 75%, 50% and 25% respectively.
Figure 9G:
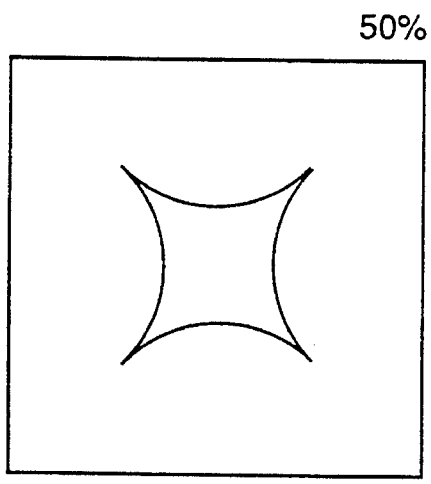
Figure 9H:
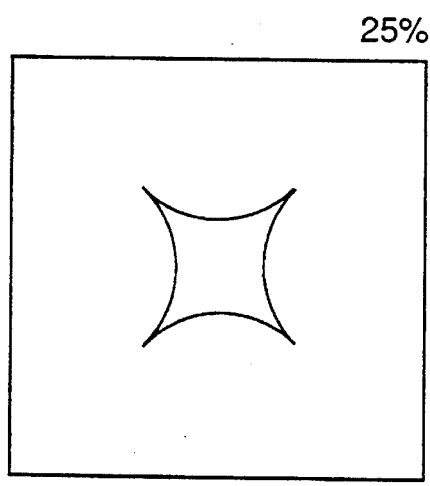

Reference is now made to FIGS. 9F–9H, which illustrate truncations of the dot of FIG. 9A, representing the printing dot at input densities of 75%, 50% and 25% respectively.

Figure 10:
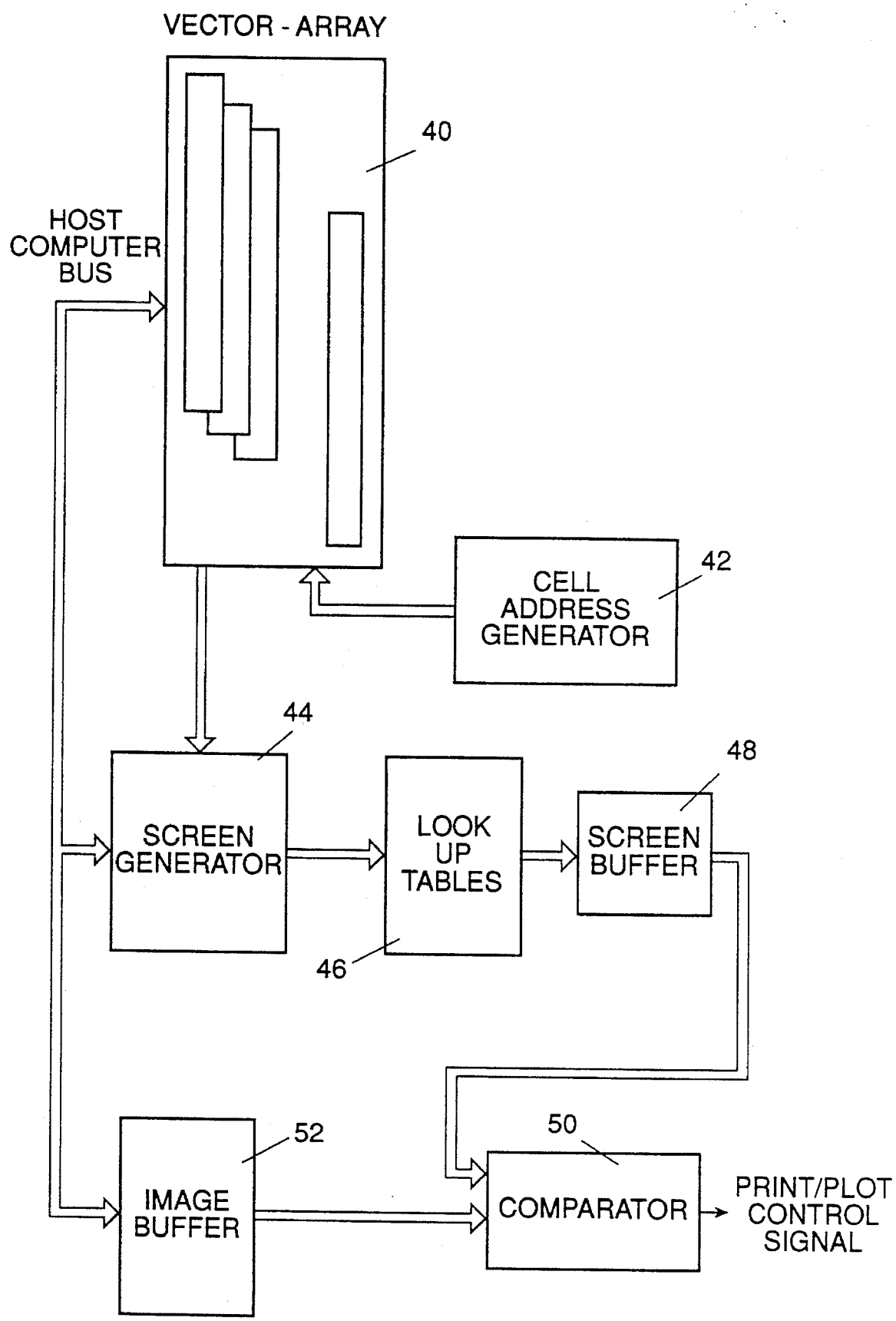
FIG. 10 is a simplified block diagram of the dot generator employed in the apparatus of FIG. 1.

Reference is now made to FIG. 10 which is a simplified block diagram of the dot generator employed in the apparatus of FIG. 1. The dot generator comprises a stored vector array 40 which includes vector information received from the CPU 14 prior to actual dot generation. The vector information includes the spatial functions mentioned hereinabove.

During dot generation, for every point on a film to be exposed, a cell address is determined by a cell address generator 42, typically employing a set of registers and an arithmetic logic unit (ALU). For each cell address, which is expressed in Cartesian coordinates x,y, a screen generator 44 calculates the screen value by operating on the spatial functions in stored vector array 40 by non-arithmetic operators. The screen generator 44 also carries out other mathematical functions in order to generate the screen values.

In accordance with one embodiment of the present invention the screen generator 44 may receive input density information of the original in order to enable automatic dot type selection to be made by the screen generator 44 in response to given levels of input densities of the original.

The screen value output of screen generator 44 is preferably supplied to a bank 46 of look up tables which is operative to provide desired linearization and corrections to the screen value output. The output of the bank of look up tables 46 is supplied via a screen buffer 48 to a comparator 50.

Comparator 50 also receives input density information of the original via an image buffer 52 and compares the input densities with the screen values thereof, effectively carrying out the truncation illustrated and described hereinabove. The output of comparator 50 is effectively an expose/do not expose instruction to the expose control circuitry 24 of laser plotter 26 (FIG. 1).

Figure 11:
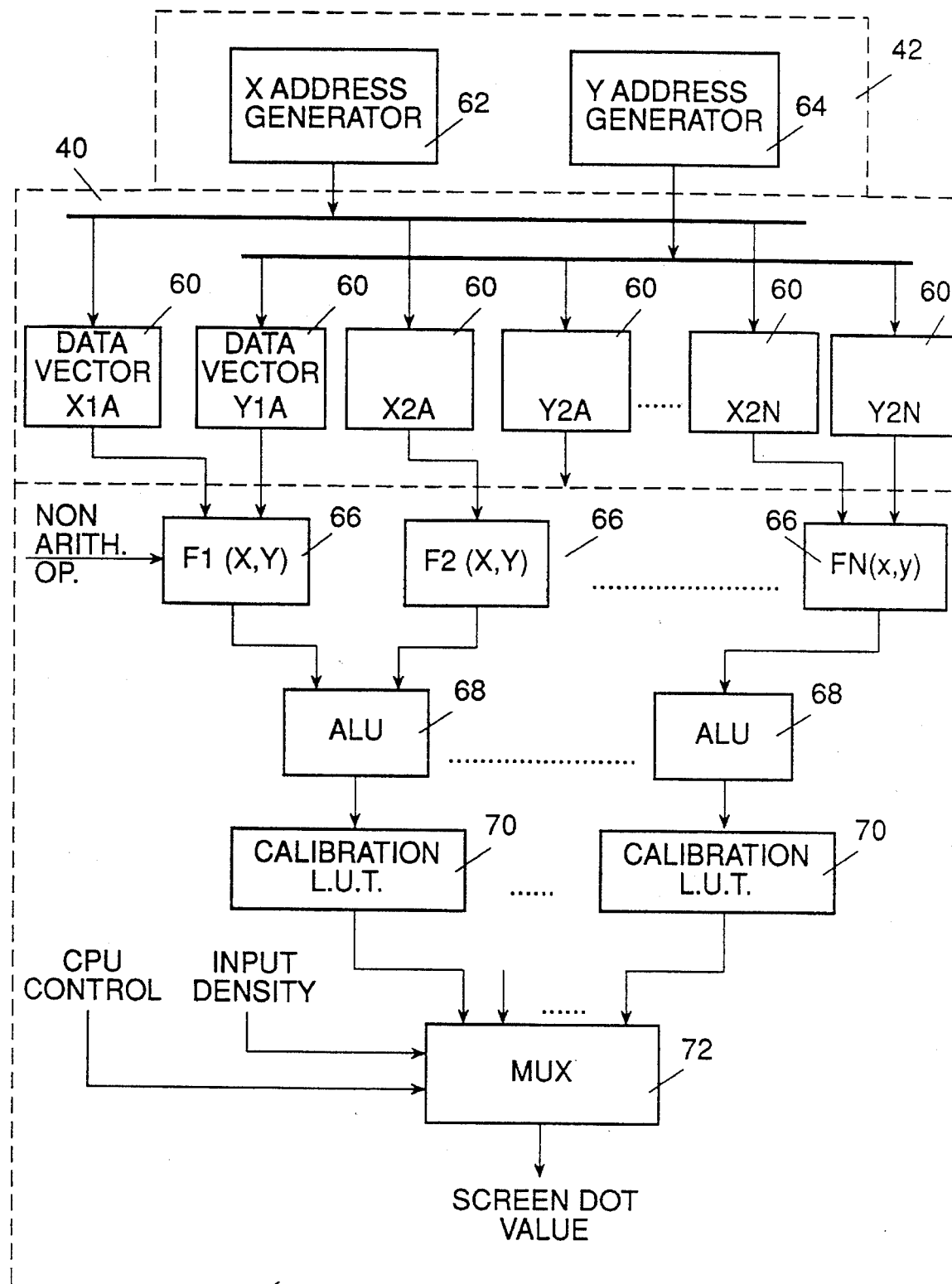
FIG. 11 is a simplified block diagram of part of the apparatus of FIG. 10.

Reference is now made to FIG. 11, which is a simplified block diagram of the vector array 40, the cell address generator 42 and the screen generator 44 shown in FIG. 10. Stored data vectors 60: X1A, Y1A, X2A and Y2A etc. receive x and y address parameters from respective x and y address generators 62 and 64 which form part of cell address generator 42 (FIG. 10).

The outputs from predetermined pairs of stored vectors 60 are supplied to non-arithmetic operators 66, each pair of which preferably output to an ALU 68. The output of each ALU 68 is supplied via a calibration look up table (CLUT) 70. A multiplexer 72 receives the outputs of all of the CLUTs 70 as well as CPU control and input density inputs which are used as selection criteria.

It is appreciated that in practice any suitable number of spatial functions may be employed, with the attendant provision of a suitable number of elements 66, 68 and 70.

Figure 12:
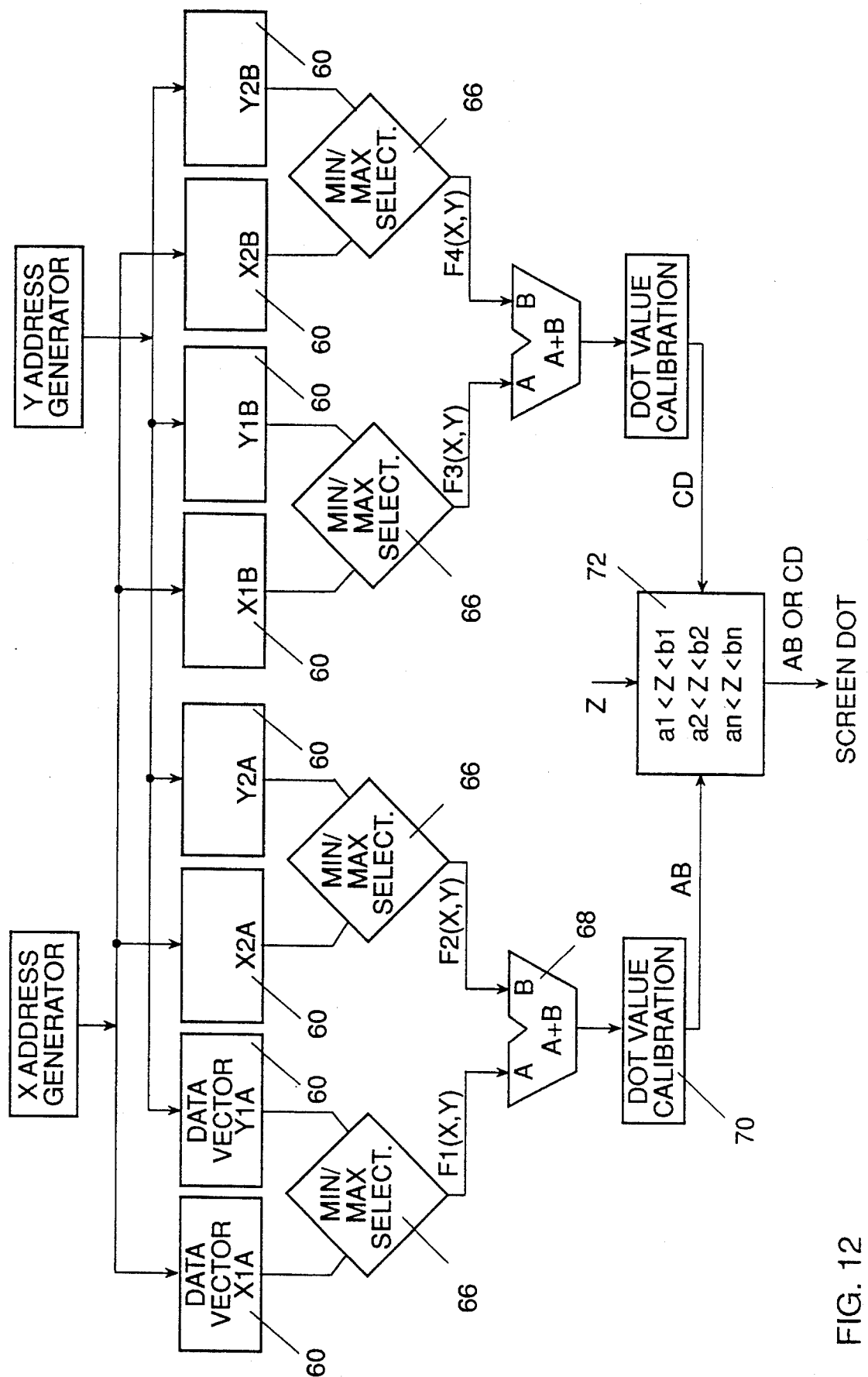
FIG. 12 is a functional illustration of the apparatus of FIG. 11.

Reference is now made to FIG. 12, which is a functional analog of one preferred embodiment of the apparatus shown in the block diagram illustration of FIG. 11. It is seen that in this preferred embodiment, the non-arithmetic operators 66 are effectively minimum/maximum selectors and the ALU 68 functions to sum the outputs of a pair of selectors 66. The CLUT 70 performs dot value calibration and the multiplexer 72 selects between the outputs of a plurality of different CLUTS 70.

Normally each CLUT 70 output represents a different dot type.

Figure 13C:
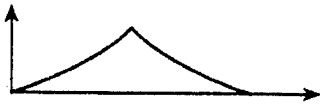
FIGS. 13A, 13B an 3C are illustrated tables used to explain the construction of five types of dots using the apparatus of FIGS. 10–12.
Figure 13C:
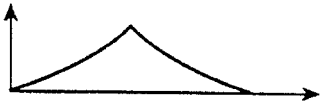
Figure 13C:
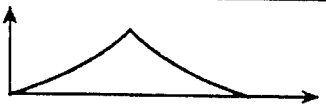
Figure 13C:
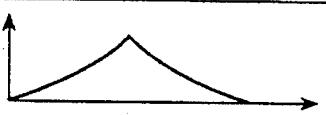
Figure 13C:
Figure 13C:
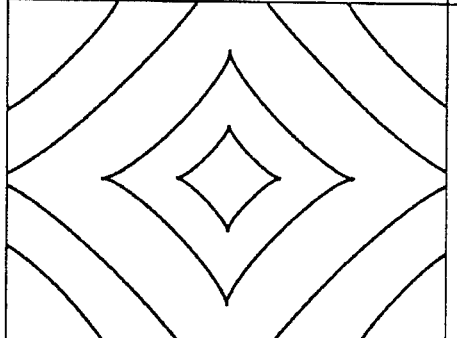
Figure 14A:
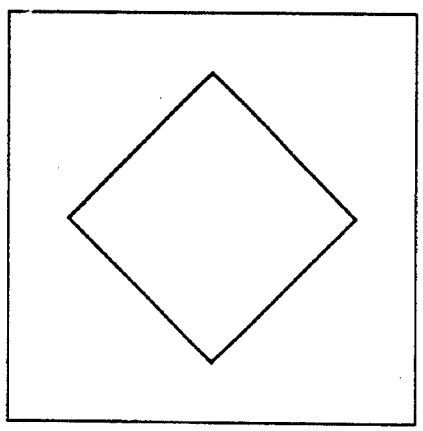
FIGS. 14A, 14B, 14C, 14D, 14E and 14F are illustrations of a dot produced using combinations of the dots illustrated in FIG. 13.
Figure 14B:
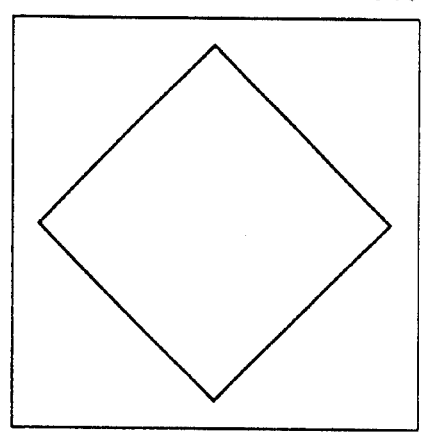
Figure 14C:
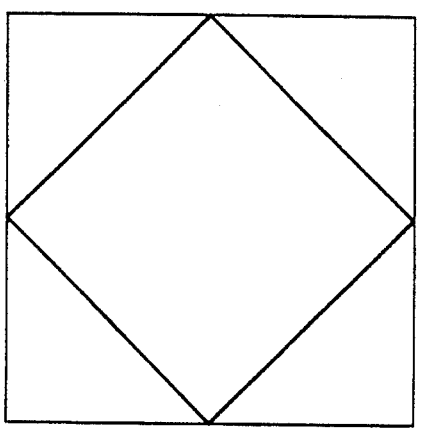
Figure 14D:
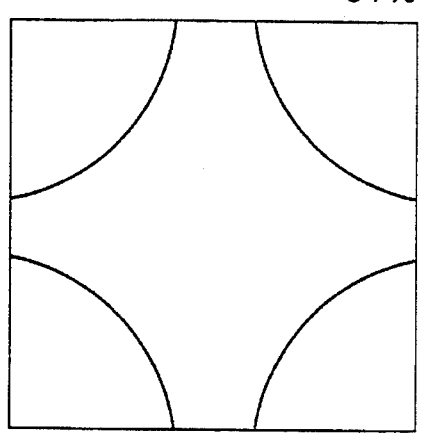
Figure 14E:
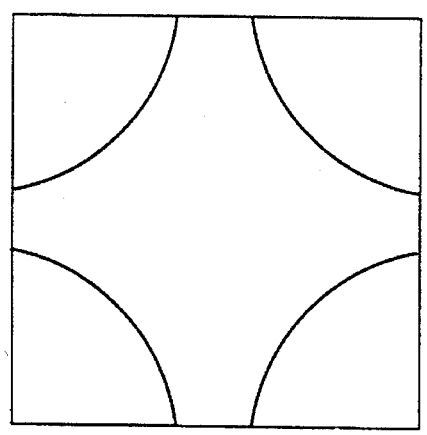
Figure 14F:
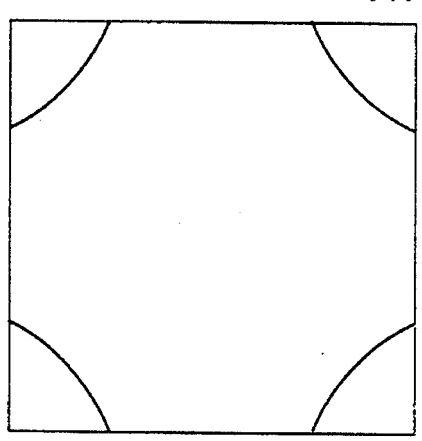
Figure 15A:
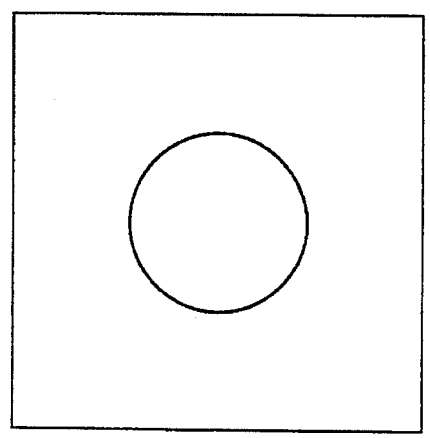
FIGS. 15A, 15B, 15C, 15D, 15E and 15F are illustrations of a dot produced using additional combinations of the dots illustrated in FIG. 13.
Figure 15B:
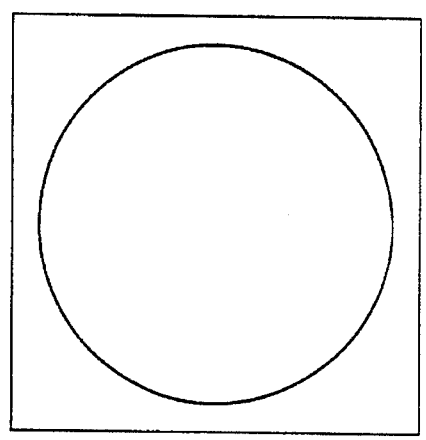
Figure 15C:
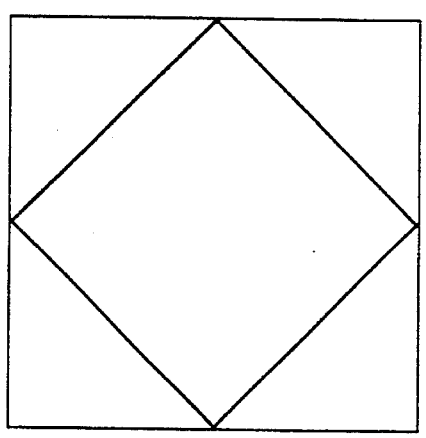
Figure 15D:
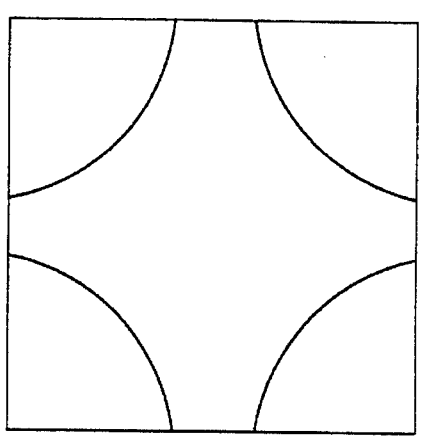
Figure 15E:
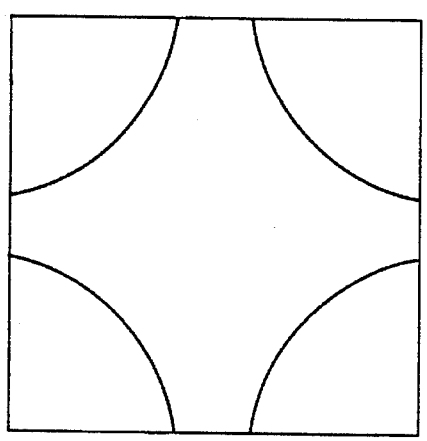
Figure 15F:
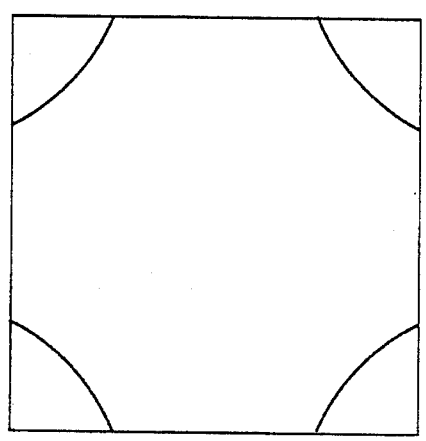

Reference is now made to FIGS. 13A, 13B and 13C which illustrate the construction of five types of dots. For each type of dot, i.e. Gravure, Combination, Square, Round and Star, four typical one dimensional spatial functions are illustrated, followed by the non-arithmetical functions which operate thereon. The output of CLUT 70 is illustrated, followed by the algorithm employed by the multiplexer 72. The dot configuration is then illustrated in the form of superimposed dot outlines for a plurality of different input densities of the original.

Reference is now made to FIGS. 14A–14F, which illustrate the operation of the apparatus of FIGS. 11 and 12 for input densities of 25%, 40%, 50%, 51%, 60% and 75%. Here it is seen that screen dot is either the star dot or the square dot, both of which appear in FIG. 13. Multiplexer 72 outputs the star dot for original input densities more than 50% and outputs the square dot for original input densities up to and including 50%.

Reference is now made to FIGS. 15A–15F, which illustrate the operation of the apparatus of FIGS. 11 and 12 for input densities of 25%, 35%, 50%, 51%, 60% and 75%.

Here it is seen that screen dot is either the star dot or the combination dot, both of which appear in FIG. 13. Multiplexer 72 outputs the star dot for original input densities more than 50% and outputs the combination dot for original input densities up to and including 50%.

Figure 16A:
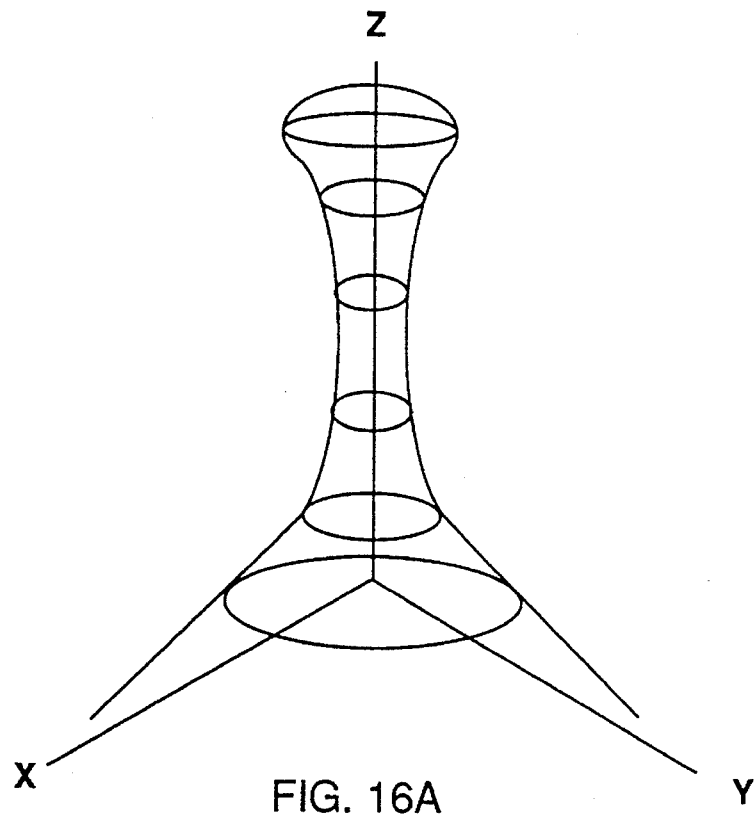
FIGS. 16A and 16B are illustrations of types of printing dots which can be produced in accordance with a preferred embodiment of the present invention.
Figure 16B:
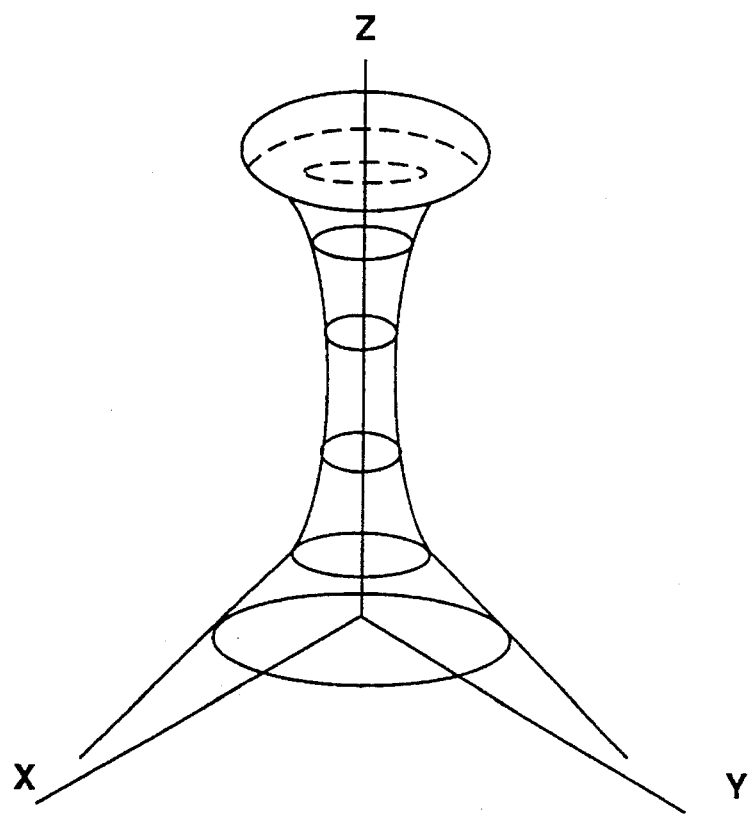

FIGS. 16A and 16B illustrate diagrams of the dot configuration versus input density for dots whose coverage of a given dot region need not increase monotonically with increasing input density. It may be appreciated that in certain cases a dot region may be exposed for a first input density and not be exposed for a higher input density. Such an occurrence may be envisioned by comparing FIGS. 14C and 14D as well as FIGS. 15C and 15D.

Figure 17:
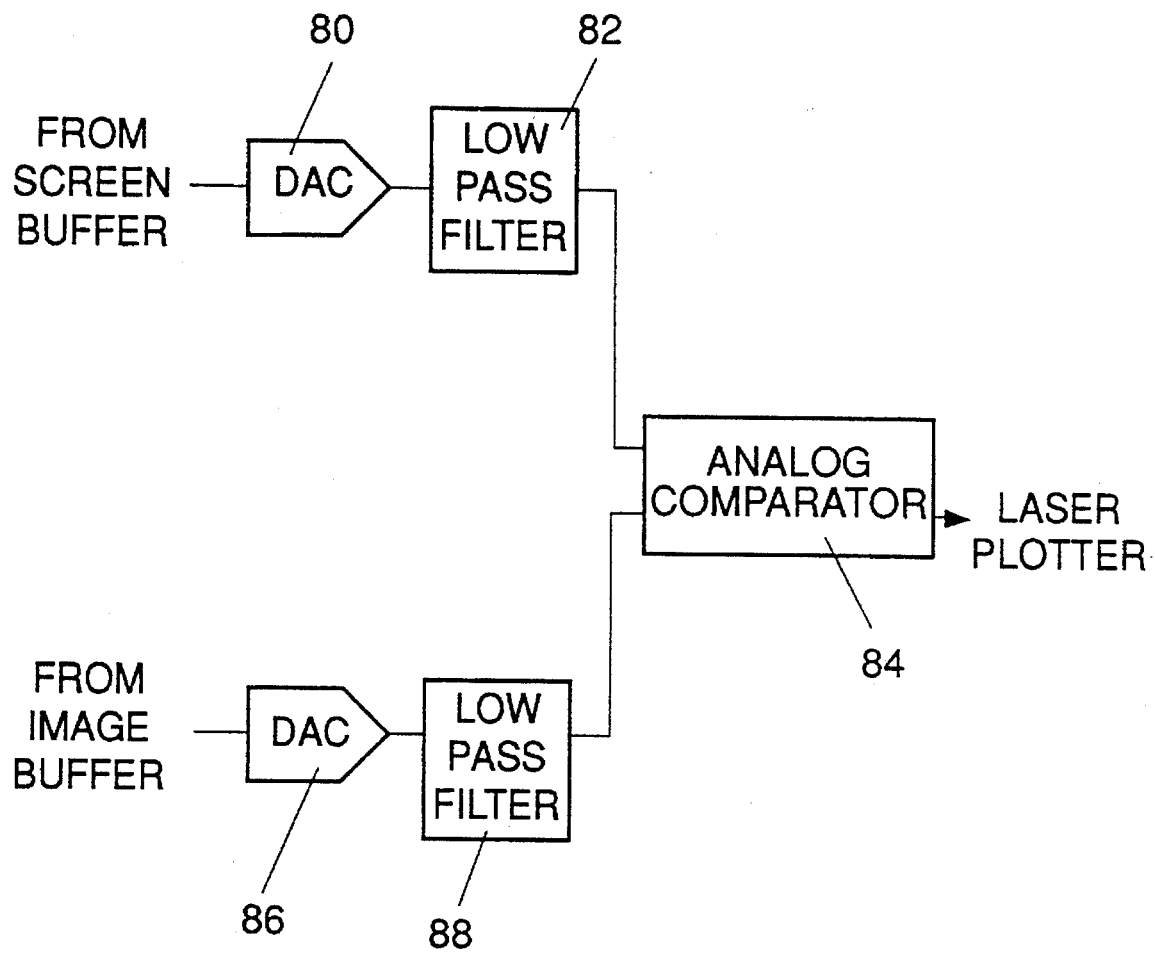
FIG. 17 is a simplified block diagram illustration of comparator apparatus employed for screen dot generation in accordance with another preferred embodiment of the invention.

Reference is now made to FIG. 17 which shows one particular preferred structure of comparator 50 of FIG. 10. The output of screen buffer 48 (FIG. 10) is supplied via a digital to analog converter 80 and a low pass filter 82 to an analog comparator 84.

Analog comparator 84 also receives the output from image buffer 52 (FIG. 10) via a digital to analog converter 86 and an optional low pass filter 88.

It will be appreciated that the low pass filter 82 is adapted to extrapolate and interpolate the values stored in screen buffer 48 so as to provide an accurate reproduction of the dot density threshold. The inclusion of low pass filter 88 depends on the quality of the input image.

The output of comparator 84 is employed to control the operation of expose control circuitry 24 (FIG. 1), indicating when the laser plotter 26 (FIG. 1) is to write. It is noted that there may also be provided various additional control functions, such as intensity control, to enhance the operation of the laser plotter 26.

Figure 18:
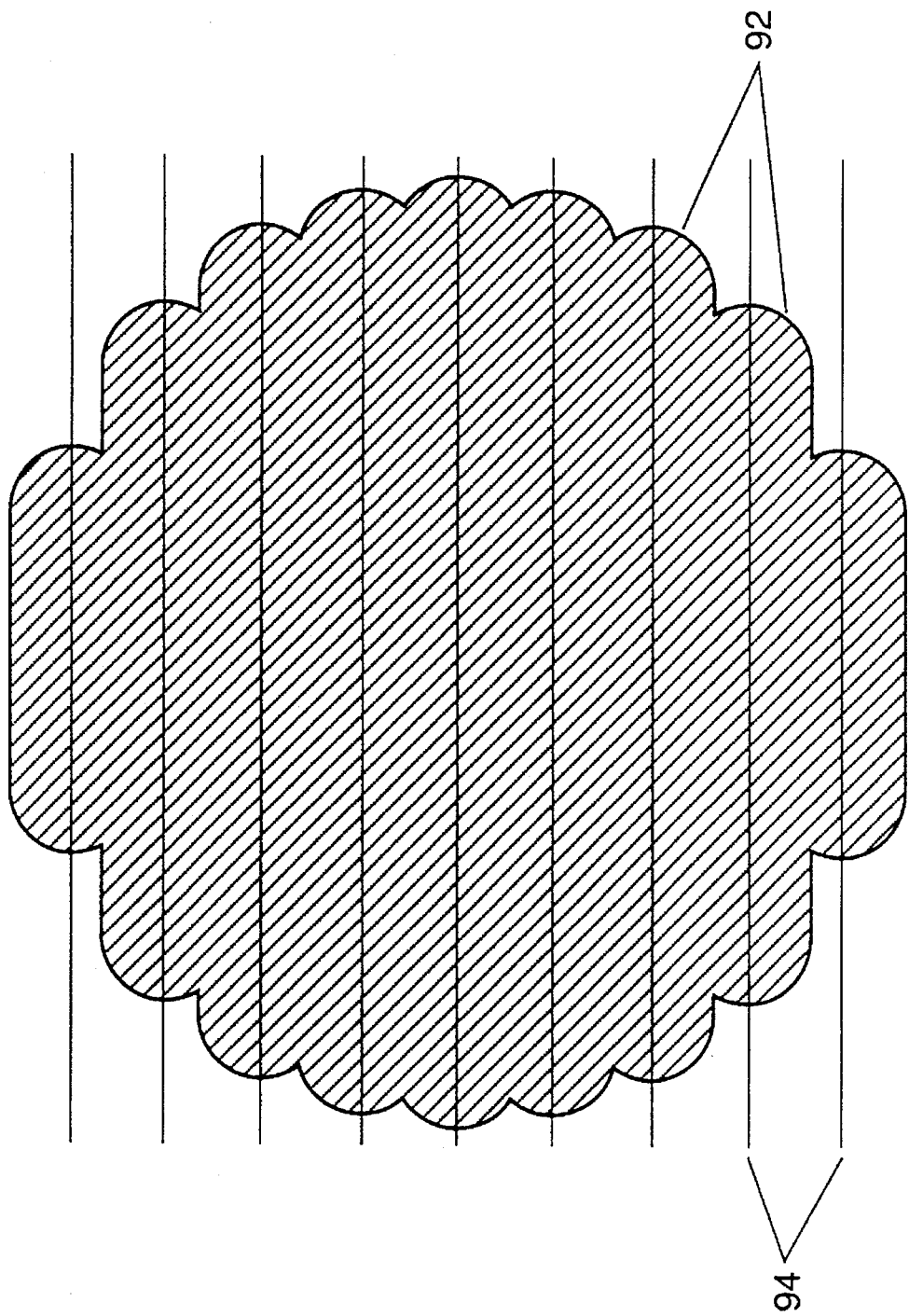
FIG. 18 is an illustration of a line by line written screen dot produced in accordance with a preferred embodiment of the invention for a uniform input density.

Reference is now made to FIG. 18, which illustrates the construction of an output screen dot. The laser plotter 26 (FIG. 1) defines a plurality of parallel lines 92, having a spacing 94, and whose beginning and end are determined by the output of comparator 84. The screen dot is a composite of such lines. In a case wherein the input density values represented by the dot are uniform, the dot will have a generally symmetrical shape, as illustrated.

In accordance with a preferred embodiment of the present invention, each written line has infinite resolution along its length, because the on/off control inputs to the laser plotter are arrived at by comparison of two generally continuous analog signals.

It will be appreciated that the apparatus and technique described hereinabove in connection with FIGS. 17 and 18 is operative to generate a grid-independent, reference screen dot value continuum which is employed for printing dot generation.

It will be appreciated by persons skilled in the art that the present invention is not limited by what has been particularly shown and described hereinabove. Rather the scope of the present invention is defined only by the claims which follow:

We claim:

1. A technique for generating a screened reproduction of an image comprising the steps of:

providing a representation of an original containing information representing the input density values of the original;

composing reference screen dots and composing printing dots using said reference screen dots and the input density values of the original, said step of composing said reference screen dots comprising employing more than two spatial functions to compose said reference screen dots independently of said input density values.

2. A technique according to claim 1 and wherein said plurality of spatial functions comprises a plurality of one-dimensional functions.

3. A technique according to claim 1 and wherein each of said plurality of spatial functions is stored in a vector memory.

4. A technique according to claim 1 and wherein said step of employing includes the step of selection of one of said plurality of spatial functions for each combination of spatial variables.

5. A technique according to claim 1 and wherein said employing step produces a two-dimensional result.

6. A technique according to claim 1 and wherein said employing step includes a plurality of parallel selection steps.

7. A technique according to claim 6 and wherein said employing step includes an arithmetic step operating on the results of said parallel selection steps.

8. A technique according to claim 1 and wherein said step of employing to compose reference screen dots comprises the step of generating a grid-independent, reference screen dot value continuum.

9. A technique for generating a screened reproduction of an image comprising the steps of providing a representation of an original containing information representing the input density values of the original;

composing reference screen dots and composing printing dots using the reference screen dots and the input density values of the original, said step of composing said reference screen dots comprising employing at least a partially non-arithmetic combination of a plurality of spatial functions to compose said reference screen dots independently of said input density values.

10. A technique according to claim 9 and wherein said plurality of spatial functions comprises a plurality of one-dimensional functions.

11. A technique according to claim 9 and wherein each of said plurality of spatial functions is stored in a vector memory.

12. A technique according to claim 9 and wherein said step of employing includes the step of selection of one of said plurality of spatial functions for each combination of spatial variables.

13. A technique according to claim 9 and wherein said employing step produces a two-dimensional result.

14. A technique according to claim 9 and wherein said employing step includes a plurality of parallel selection steps.

15. A technique according to claim 14 and wherein said employing step includes an arithmetic step operating on the results of said parallel selection steps.

16. A technique according to claim 9 and wherein said step of employing to compose reference screen dots comprises the step of generating a grid-independent, reference screen dot value continuum.

17. A technique for generating a screened reproduction of an image comprising the steps of:

providing a representation of an original containing information representing the input density values of the original;

composing reference screen dots; and composing printing dots using the reference screen dots and the input density values of the original, said step of composing said reference screen dots comprising:

employing a plurality of spatial functions to compose reference screen dots, including the steps of:

employing a first plurality of spatial functions independently of said input density values to produce a first result;

employing a second plurality of spatial functions independently of said input density values to produce a second result; and selecting between said first result and said second result to compose said reference screen dots.

18. A technique according to claim 17 and wherein said step of selecting between said first result and said second result is carried out on the basis of the input density values of the original.

19. A technique according to claim 17 and wherein said employing step also includes the step of employing at least one additional plurality of spatial functions to produce at least one additional result and wherein said step of selecting between said first result and said second result is operative to select between said first, second and at least one additional plurality of results.

20. A technique according to claim 17 and wherein said step of employing to compose reference screen dots comprises the step of generating a grid-independent, reference screen dot value continuum.

* * * * *